(12) United States Patent
Dunn

(10) Patent No.: US 11,835,172 B2
(45) Date of Patent: Dec. 5, 2023

(54) TRIPODS, COUPLING JOINTS AND OTHER SUPPORT COMPONENTRY FOR CAMERAS LIGHTING AND OTHER EQUIPMENT

(71) Applicant: North Rim Investment Group Ltd., Winnipeg (CA)

(72) Inventor: Chris A. Dunn, Winnipeg (CA)

(73) Assignee: Worth Rim Investment Group Ltd., Winnipeg (CA)

( * ) Notice: Subject to any disclaimer, the term of this patent is extended or adjusted under 35 U.S.C. 154(b) by 121 days.

(21) Appl. No.: 17/330,655

(22) Filed: May 26, 2021

(65) Prior Publication Data

US 2021/0400175 A1 Dec. 23, 2021

Related U.S. Application Data

(60) Provisional application No. 63/029,817, filed on May 26, 2020.

(51) Int. Cl.
*F16M 11/34* (2006.01)
*G03B 17/56* (2021.01)
*H04N 23/50* (2023.01)

(52) U.S. Cl.
CPC .......... *F16M 11/34* (2013.01); *G03B 17/561* (2013.01); *H04N 23/50* (2023.01); *F16M 2200/022* (2013.01)

(58) Field of Classification Search
CPC .. F16M 13/02; F16M 2200/022; F16M 11/22; F16M 11/24; F16M 11/26; F16M 11/34; F16M 11/38; F16M 11/245; F16M 11/242; F16C 11/06; G03B 15/02; G03B 17/00; G03B 17/561; H04N 23/50
See application file for complete search history.

(56) References Cited

U.S. PATENT DOCUMENTS 2,166,258 A * 7/1939 Matrat .................. F16M 11/16
248/188
2,229,474 A * 1/1941 Redmer ................ F16M 11/16
248/188

(Continued)

FOREIGN PATENT DOCUMENTS

GB 2578637 A * 5/2020 ............. F16M 11/24

*Primary Examiner* — Eret C McNichols
(74) *Attorney, Agent, or Firm* — Michael R. Williams; Kyle R Satterthwaite; Ade & Company Inc.

(57) ABSTRACT

Tripods and other support componentry for cameras, lighting and other equipment including a convertible tripod selfie-stick with dog-legged tripod legs collapsible together to form a singular selfie-stick shaft, foldable couplers on the tripod legs for optional attachment of supplemental feet thereto, a yoke body with a threaded collar that both tightens a ball and socket joint of each tripod leg and anchors a secondary tethering of each leg, a string-of-pearls latching mechanism for providing such secondary tethering of other components, a magnetic basal of lobe-shaped footprint and composite construction, a squeeze lever lock for telescopic tubes of a tripod leg or the like, a slidable ring coupler displaceable along a tripod leg or other shaft and lockable thereto via a tightenable collet, a rock-and-dock accessory mount for a tripod leg or the like, and a smartphone/tablet holder and cooperating case with a ball and socket connection.

20 Claims, 14 Drawing Sheets

(56) References Cited

U.S. PATENT DOCUMENTS

| | | | | |
|---|---|---|---|---|
| 2,919,093 | A * | 12/1959 | Mooney | F16M 11/2078 248/188 |
| 3,211,405 | A * | 10/1965 | Fey | F16M 11/16 248/168 |
| 3,881,675 | A * | 5/1975 | Matchett | F16M 11/242 248/170 |
| 6,651,347 | B2 * | 11/2003 | Uhl | B27B 17/00 30/296.1 |
| 6,702,482 | B2 * | 3/2004 | Sherwin | G03B 17/561 396/428 |
| 8,197,149 | B2 * | 6/2012 | Darrow | F16M 11/36 396/428 |
| 9,851,625 | B1 * | 12/2017 | Fernandez | H02J 7/00 |
| 11,143,356 | B2 * | 10/2021 | Dunn | F16M 13/04 |
| 11,353,781 | B2 * | 6/2022 | Zou | F16M 11/242 |
| 11,552,365 | B2 * | 1/2023 | Williams | F04D 29/601 |
| 2007/0090235 | A1 * | 4/2007 | Ziemkowski | F16M 13/00 248/163.1 |
| 2010/0064739 | A1 * | 3/2010 | Lu | F16M 11/34 70/57 |
| 2011/0073722 | A1 * | 3/2011 | Meuret | F16M 11/34 248/169 |
| 2018/0106418 | A1 * | 4/2018 | Anglin | H04N 23/695 |

* cited by examiner

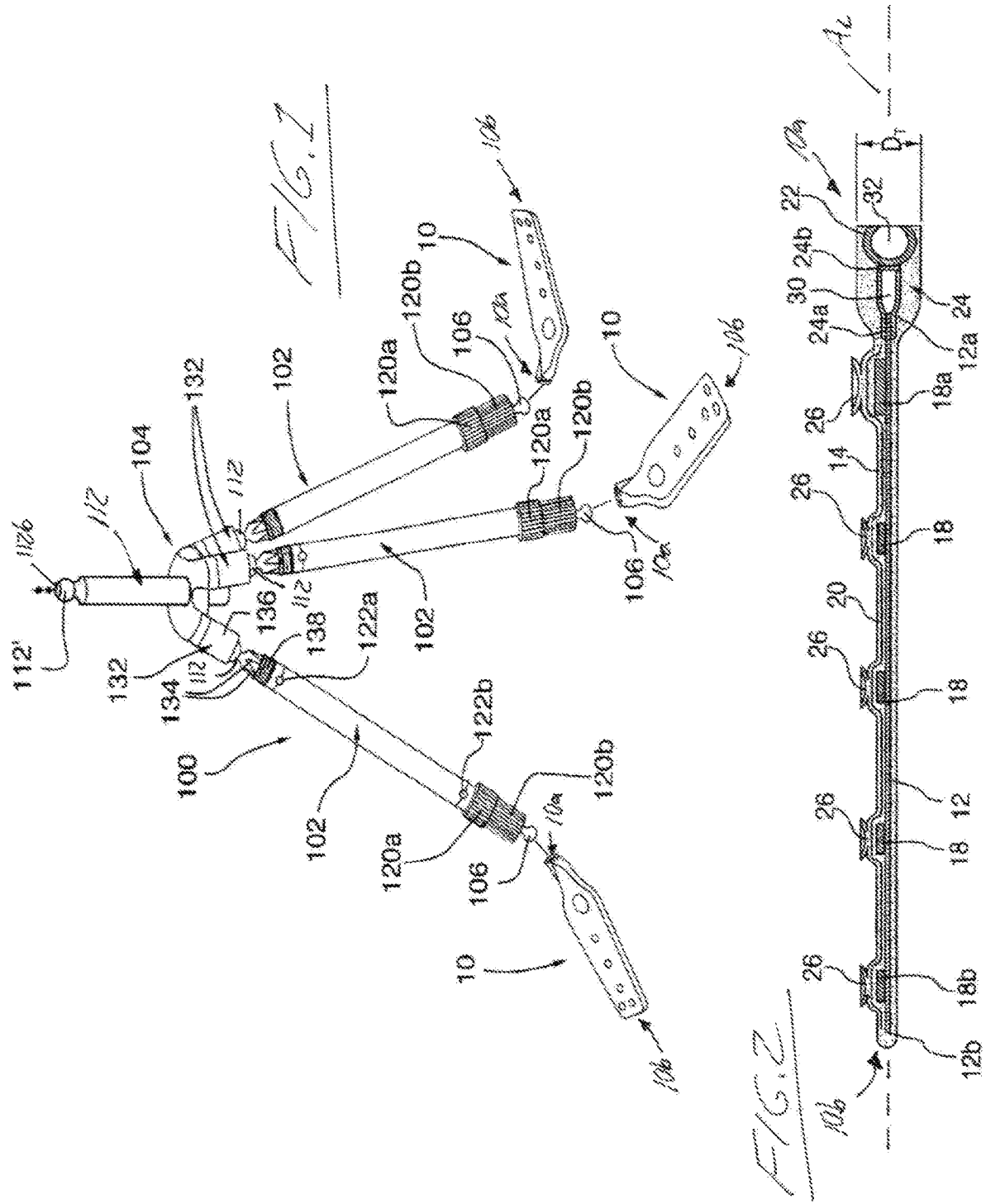

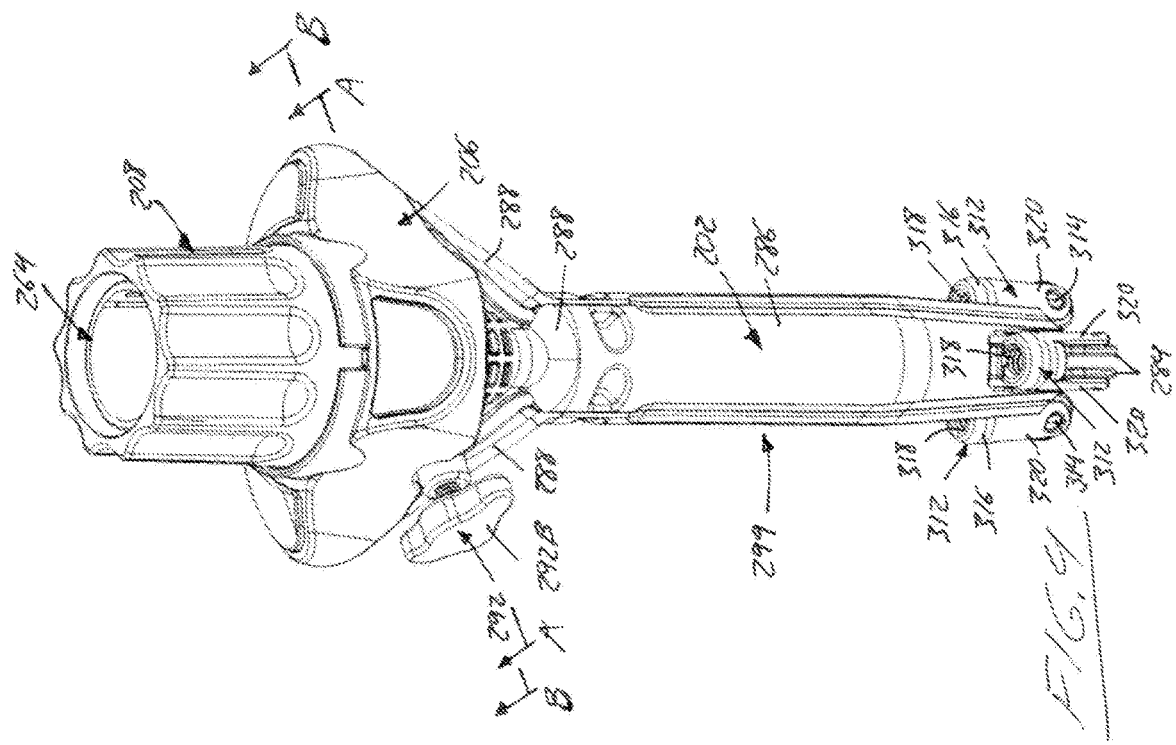
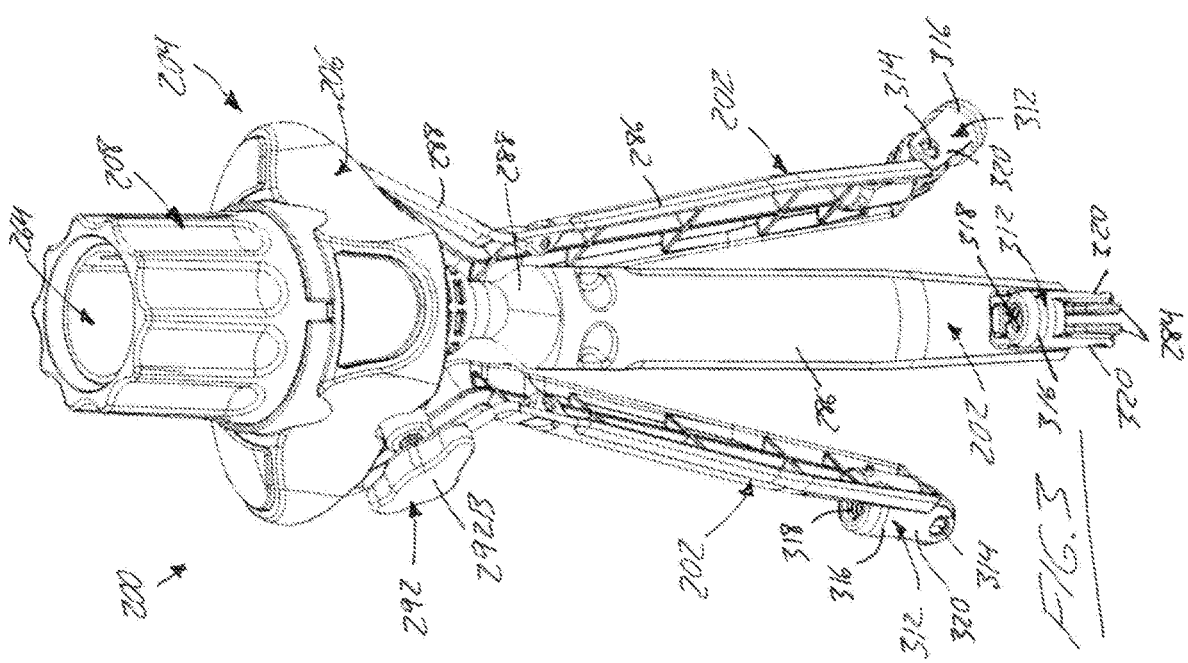

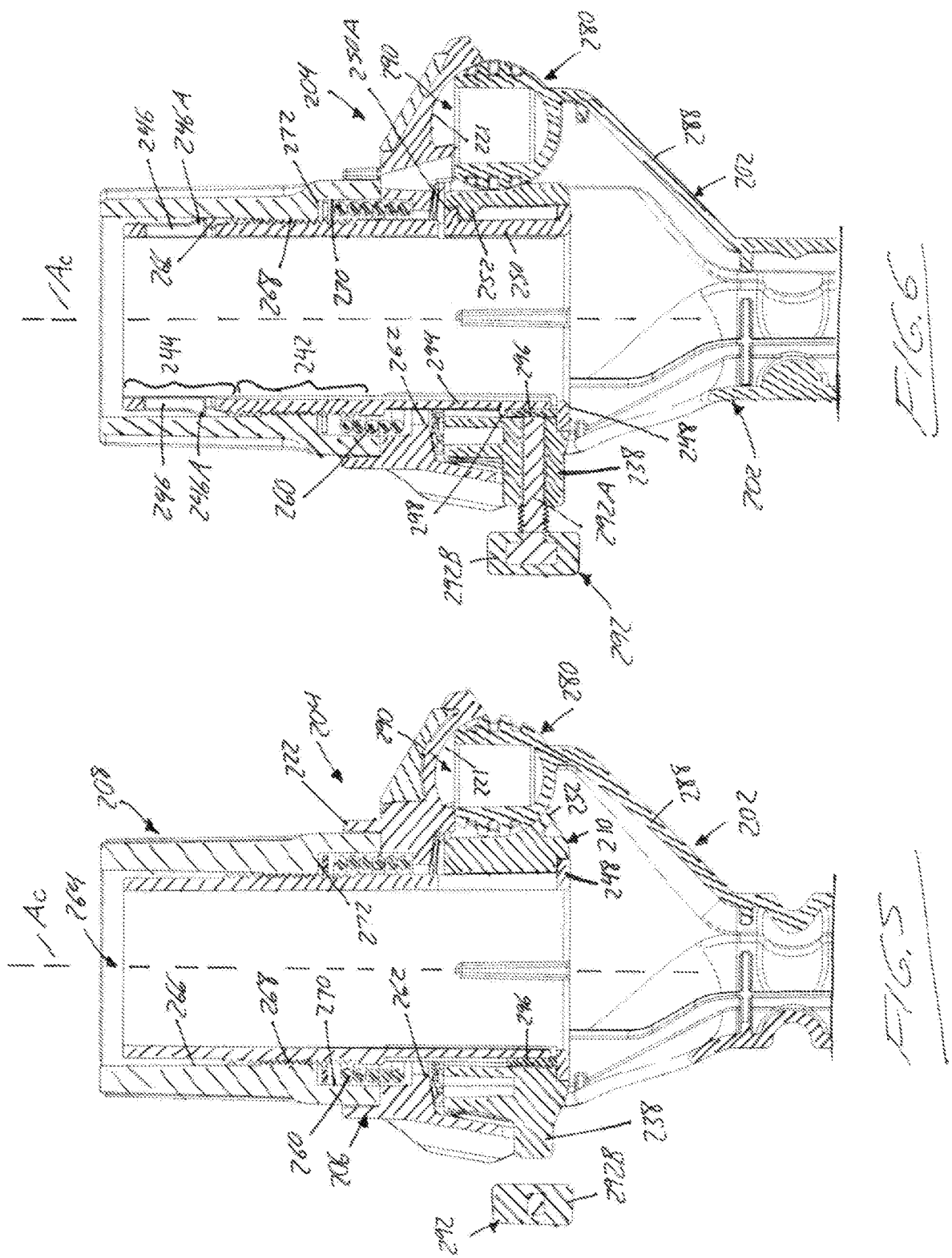

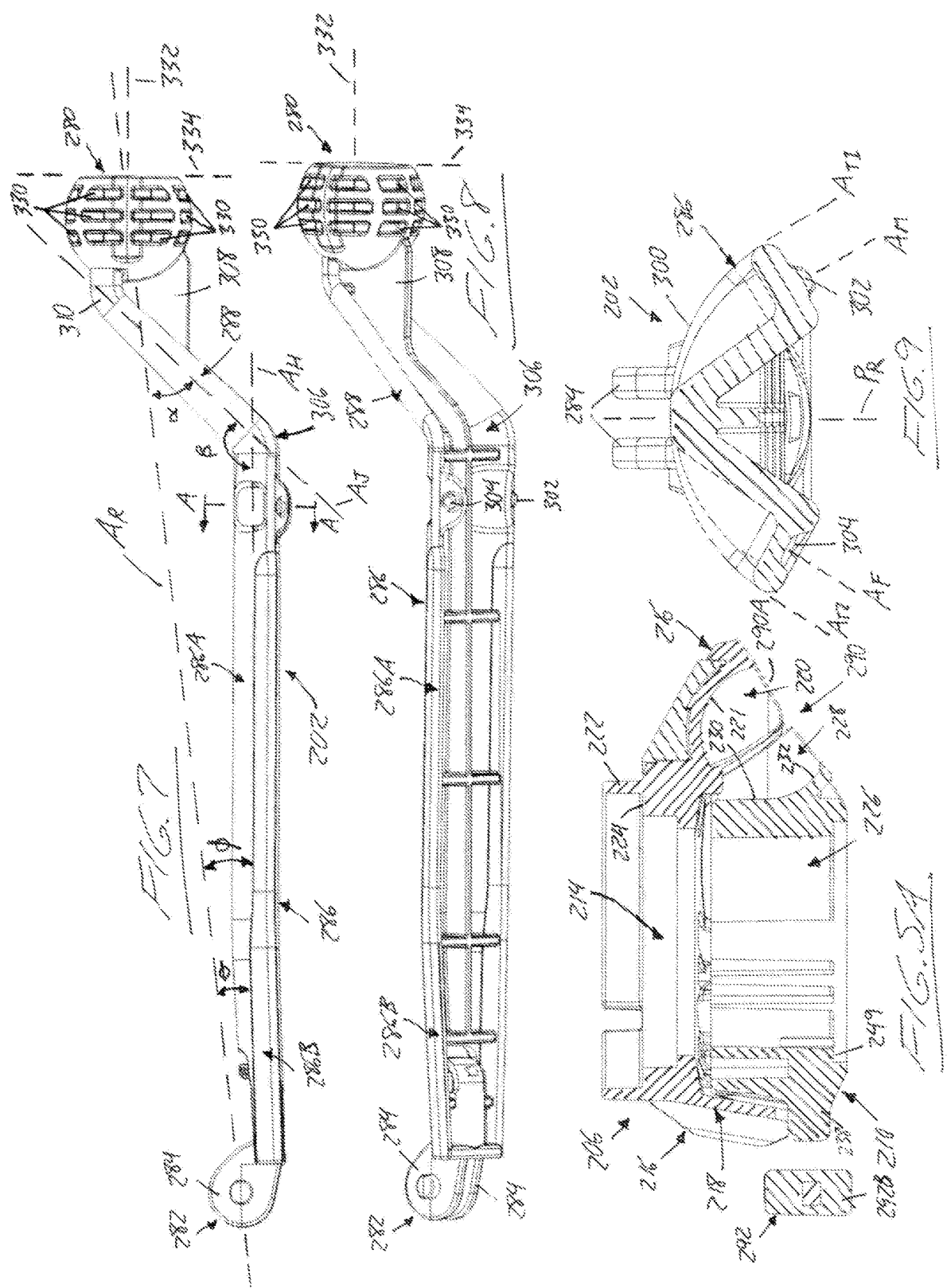

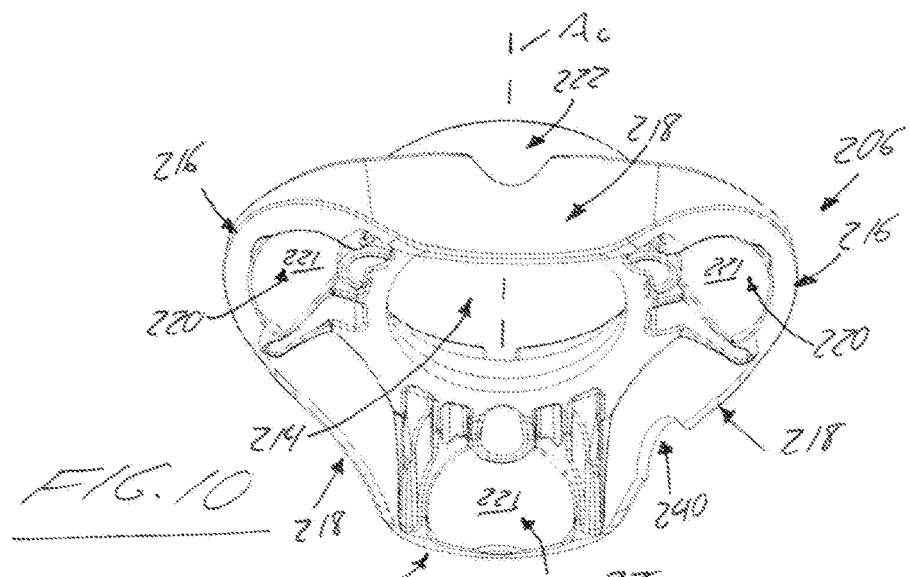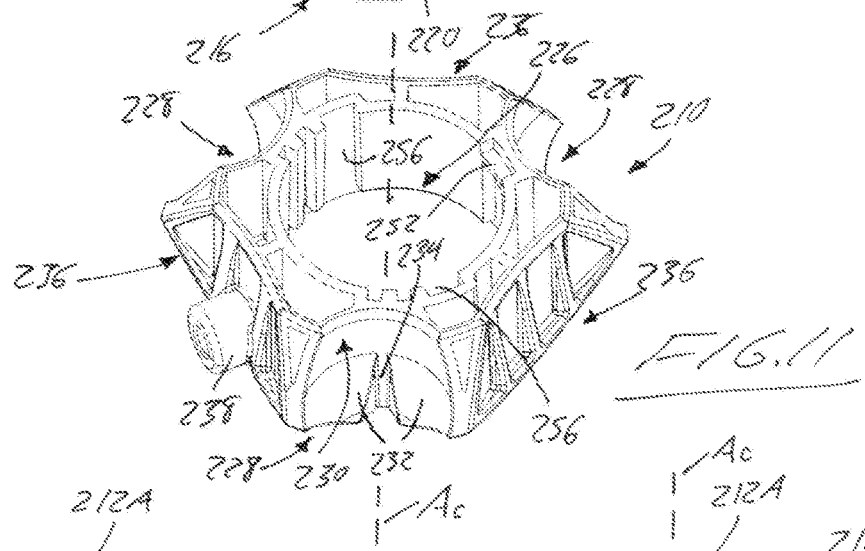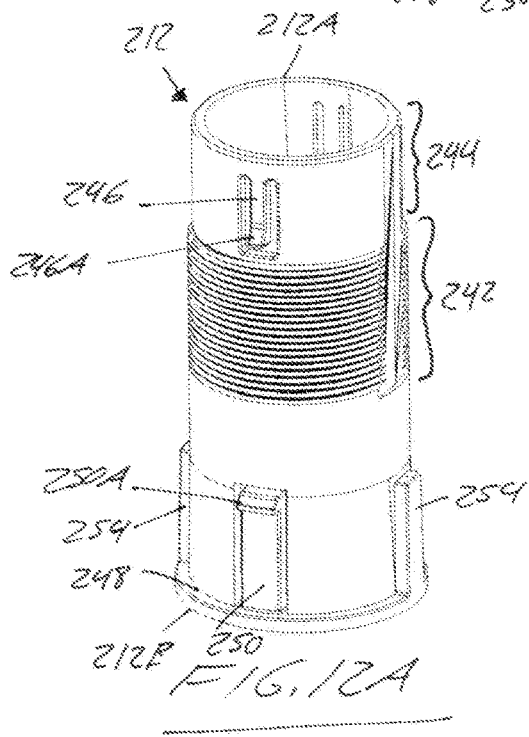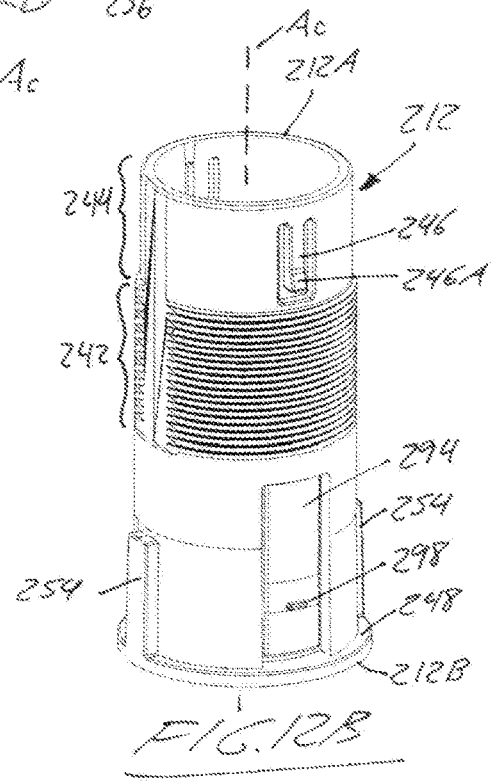

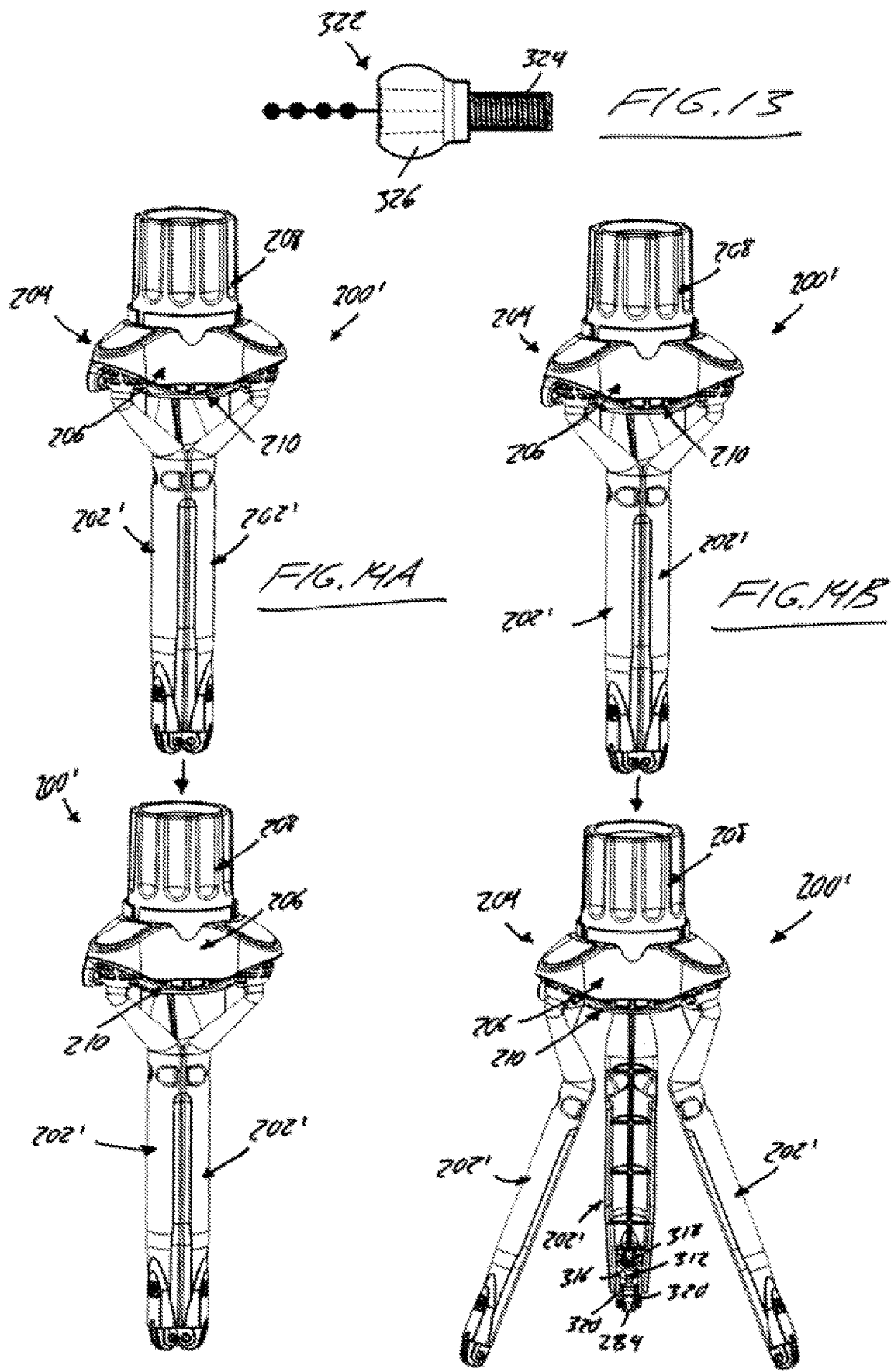

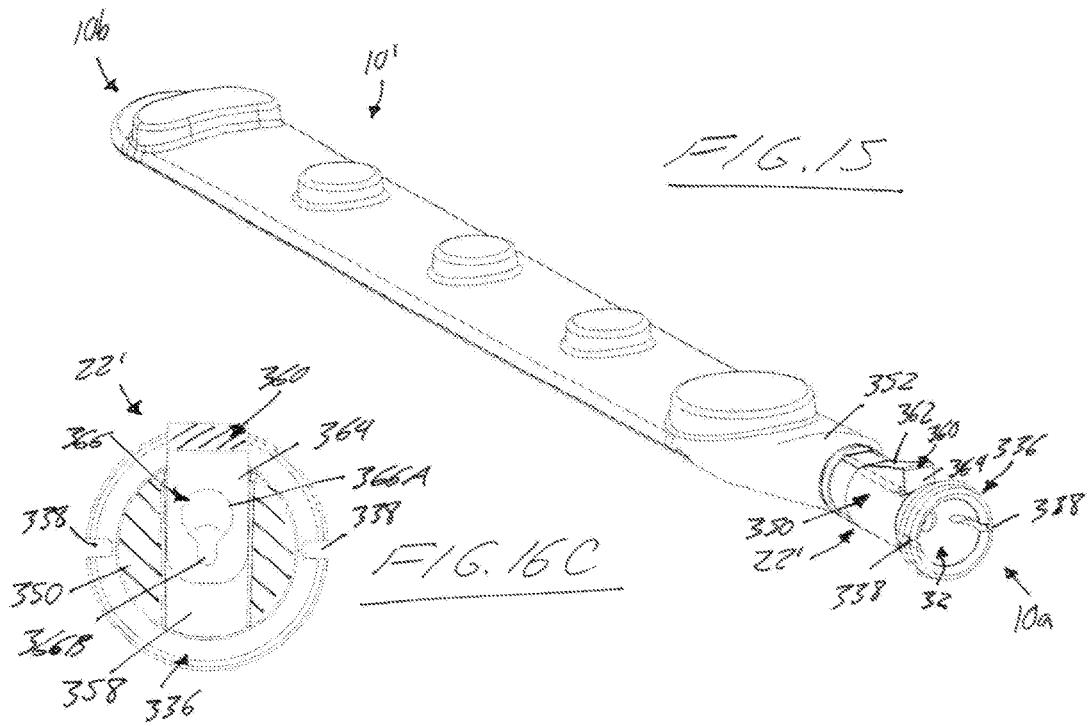
FIG. 15
FIG. 16C
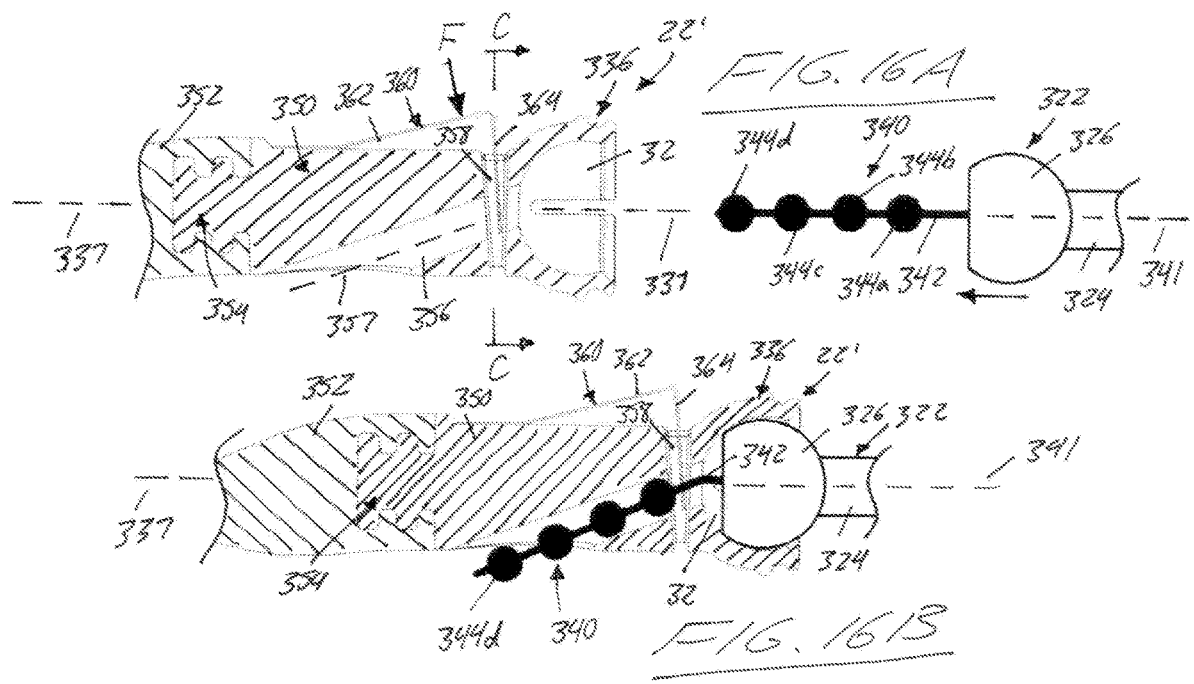
FIG. 16A
FIG. 16B

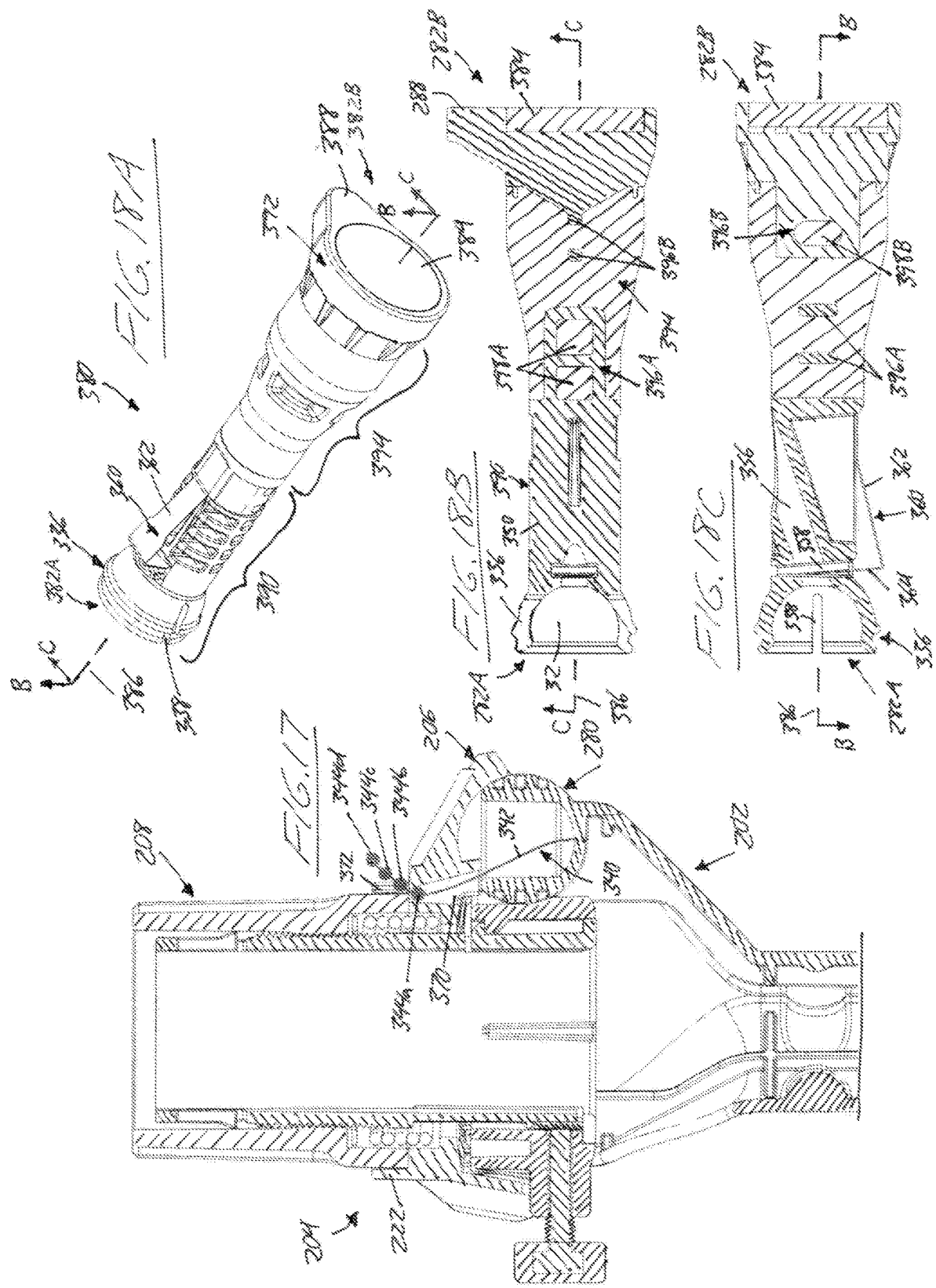

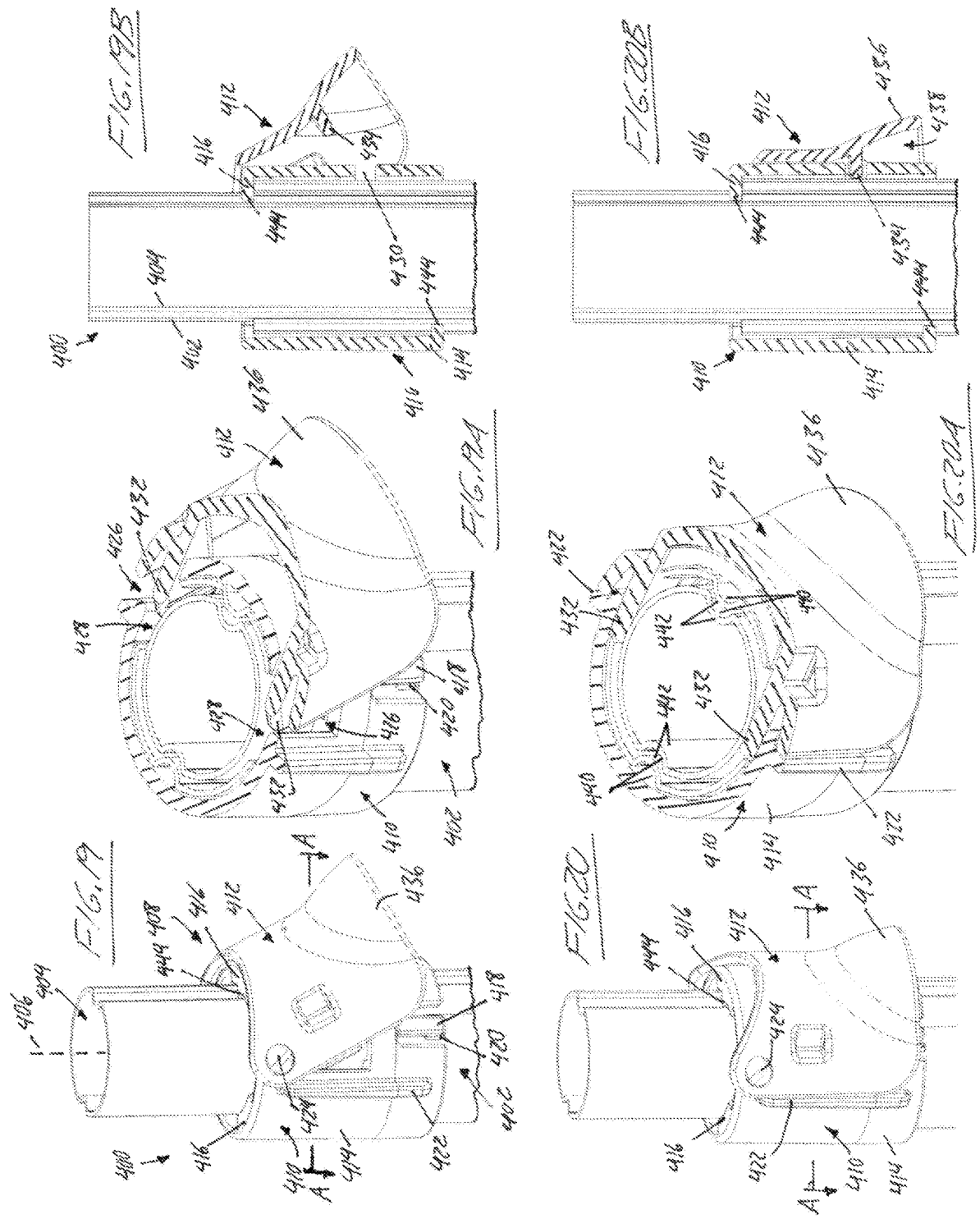

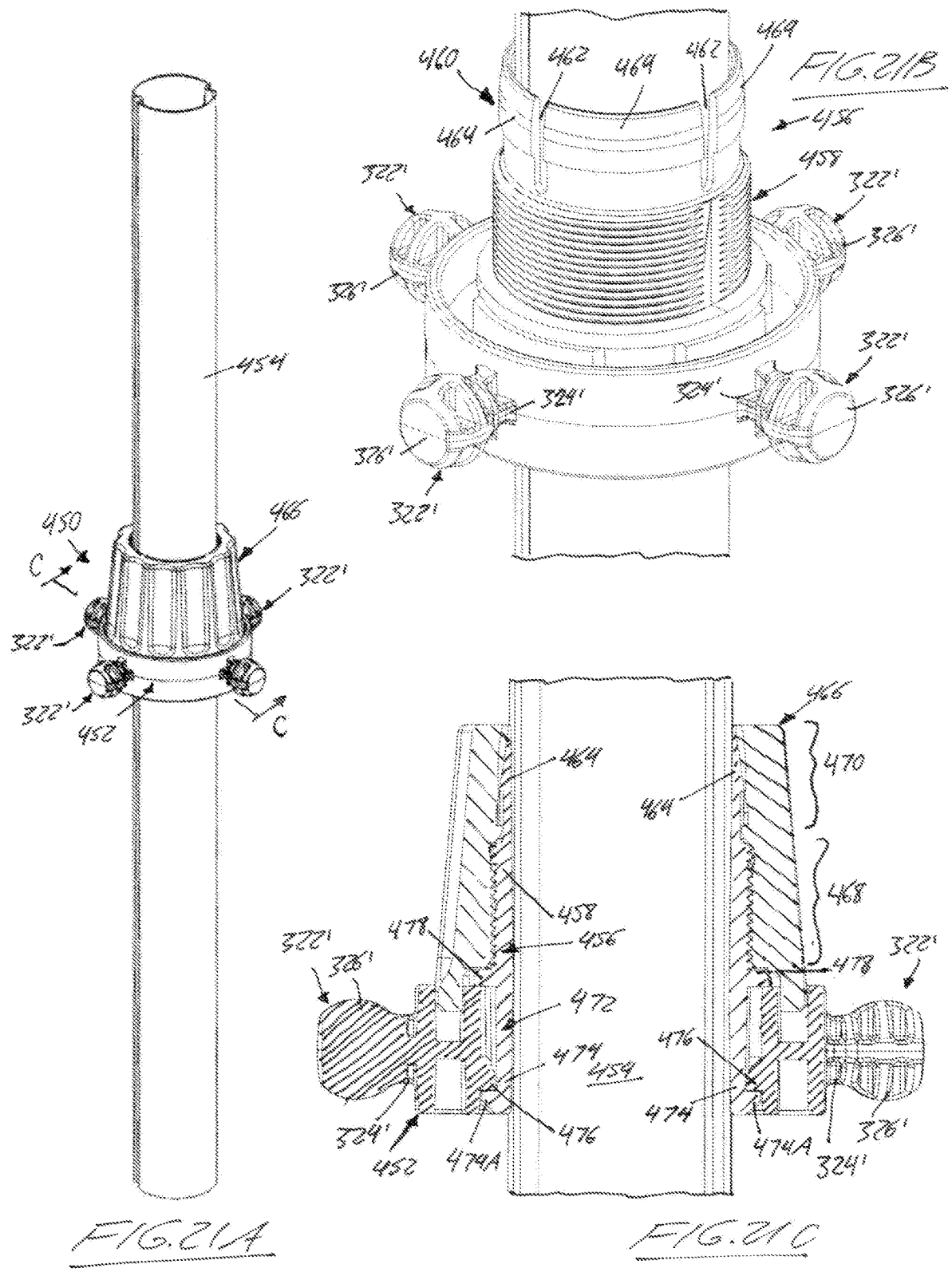

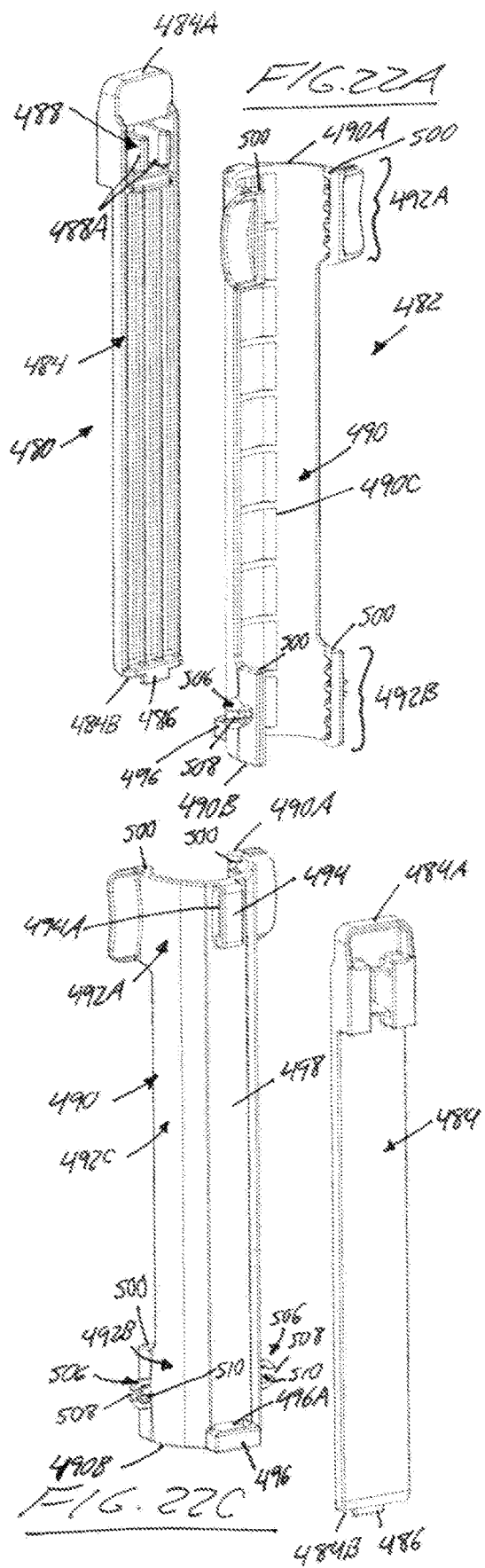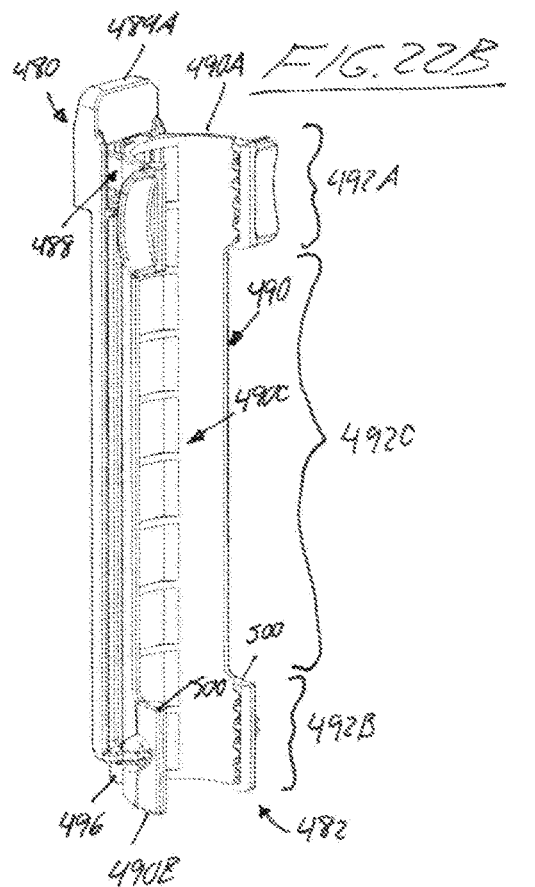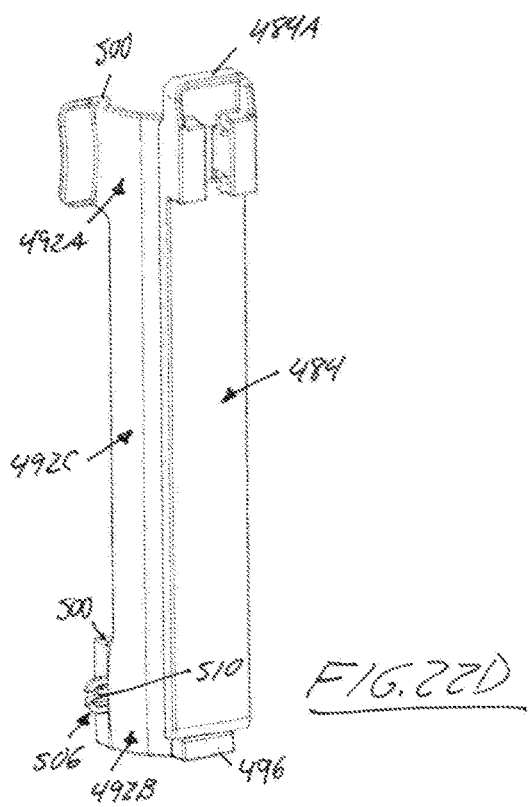

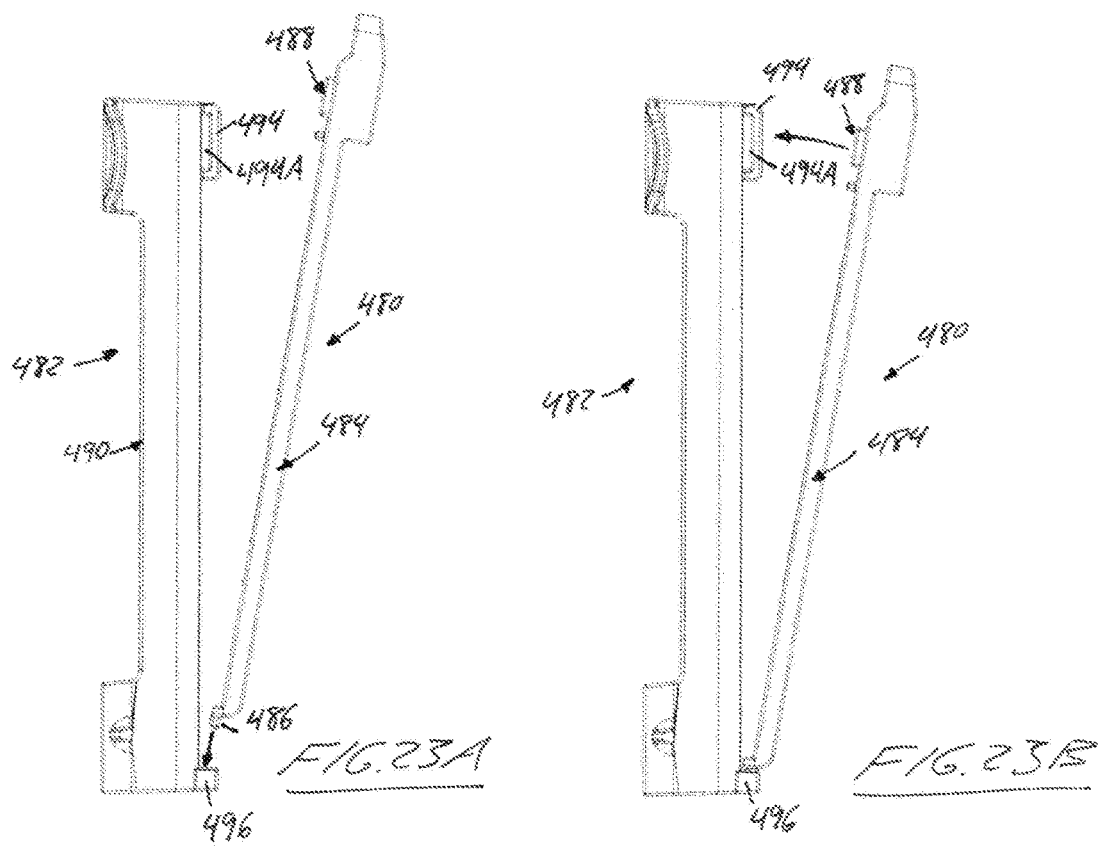
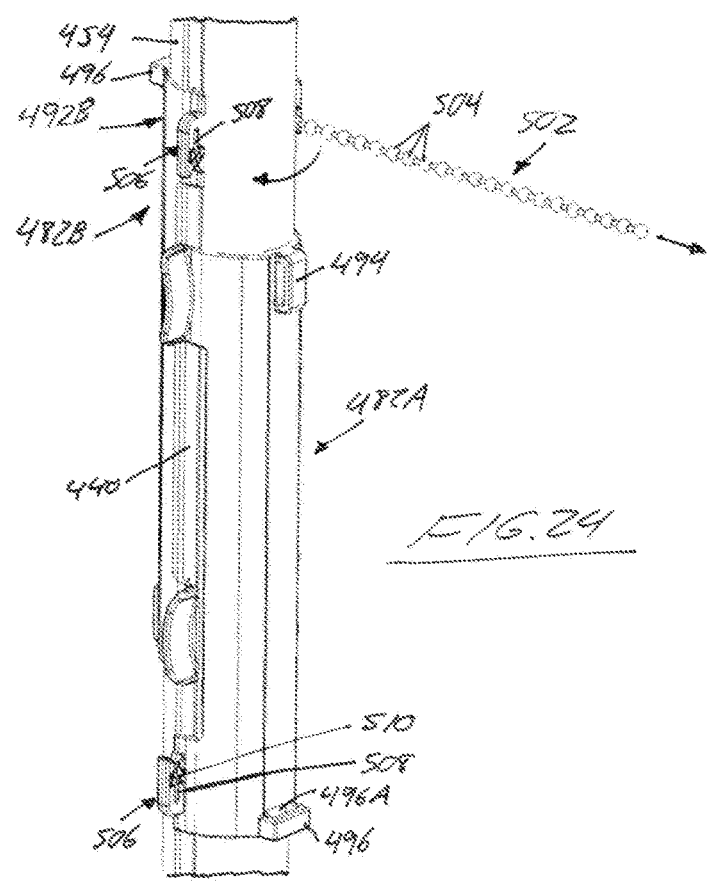

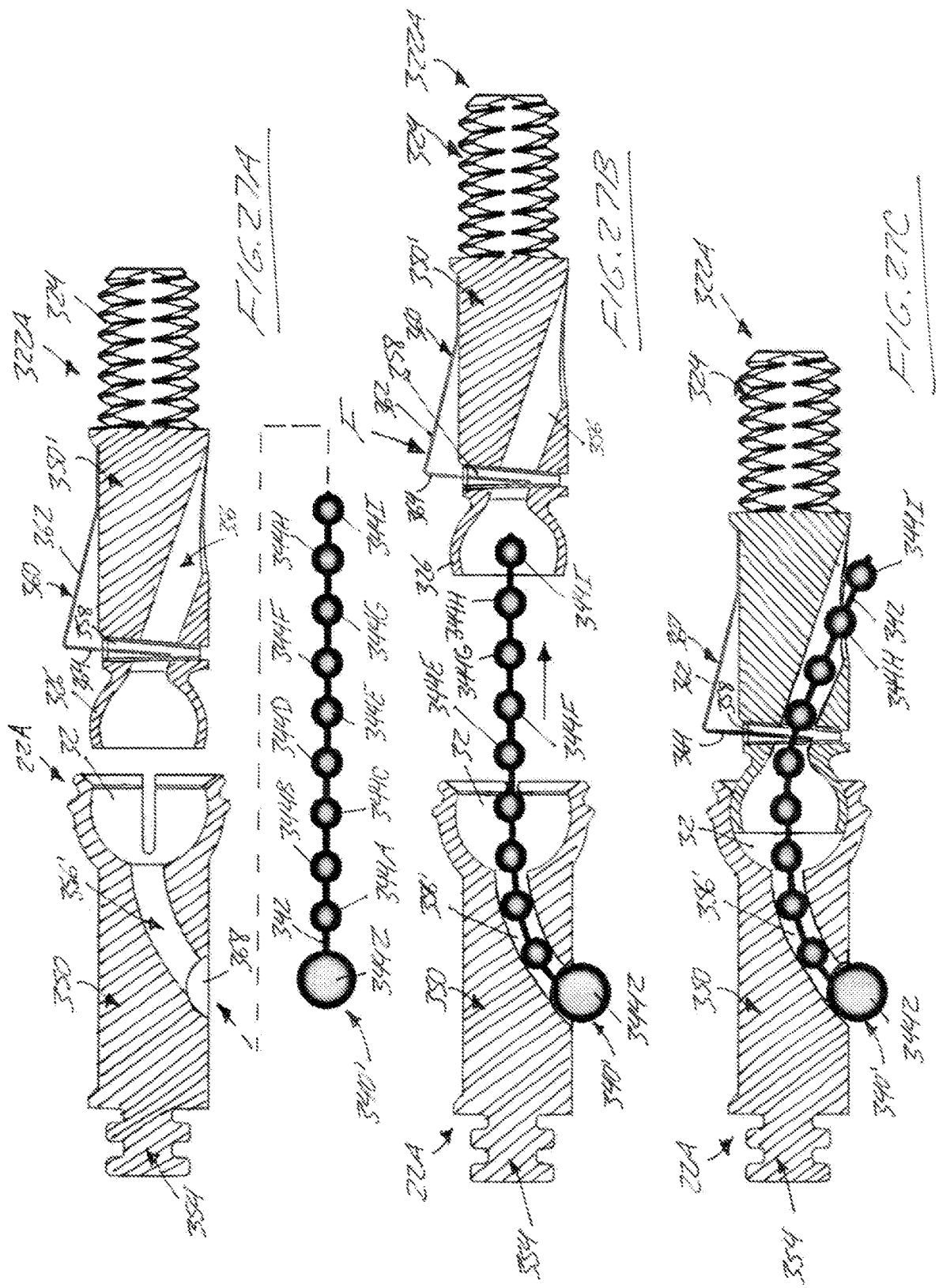

US 11,835,172 B2

TRIPODS, COUPLING JOINTS AND OTHER SUPPORT COMPONENTRY FOR CAMERAS LIGHTING AND OTHER EQUIPMENT

CROSS-REFERENCE TO RELATED APPLICATIONS

This application claims foreign priority benefit under 35 U.S.C. 119(e) of U.S. Provisional Patent Application No. 63/029,817, filed May 26, 2020, the entirety of which is incorporated herein by reference.

FIELD OF THE INVENTION

The present invention relates generally to tripods, monopods, selfie-sticks and other supportive means for camera and lighting equipment.

BACKGROUND

With advances in digital photography and videography equipment, the widescale adoption of smartphone technology incorporating such photographic and videographic capabilities, and the explosive growth of online distribution channels through which photographic and videographic content is easily posted and widely shared, there exists notable demand for user friendly, flexible, adaptable camera support equipment usable by professional and amateur photographers and videographers to provide stable camera support for quality shots in various environments from various viewpoints.

Applicant's prior PCT application PCT/CA2019/051459, filed Oct. 15, 2019, the entirety of which is incorporated herein by reference, discloses unique tripod products and associated componentry and accessories that at least partially address this need in the marketplace, but further improvements and additions have since been developed, which are the subject of the present application.

SUMMARY OF THE INVENTION

According to a first aspect of the invention, there is provided a convertible tripod apparatus comprising:
  a yoke comprising a set of three sockets distributed in circumferentially spaced fashion around a central axis of said yoke at a radially spaced distance outward therefrom, said sockets facing a common direction along said central axis; and
  a set of three legs each having a proximal ball-shaped end mated or matable with a respective one of the sockets of said yoke to form a ball and socket joint therewith about which the leg is movable into a variety of different angular orientations relative to a central axis, and a distal end residing oppositely of said proximal end on a linear reference axis of said leg;
  wherein each leg, between the proximal ball-shaped end and the distal end, is composed of angularly distinct segments of non-parallel relation to one another and to said reference axis, said angularly distinct sections including hand-grip segment and a joining segment, of which the hand-grip segment resides nearer to the distal end and the joining segment resides nearer to the ball-shaped proximal end to join the hand-grip segment thereto; and
  wherein the legs are movable between first positions in which the hand-grip segments thereof are mated together in parallel and adjacent relation to one another to collectively form a selfie-stick shaft by which the yoke can be manually carried, and second positions in which the hand-grip segments diverge outwardly away from one another and from said central axis in said common direction faced by said socket to form a tripod base atop which the yoke is supported.

According to a second aspect of the invention, there is provided a tripod leg comprising:
  an elongated leg structure having a proximal end connected or connectable to a yoke of a tripod, and a distal end lying oppositely of said proximal end in a longitudinal direction in which said leg structure is elongated; and
  a coupler movably attached to said elongated leg structure proximate the distal end of said elongated leg structure, and movable between a deployed position protruding beyond said distal end of the elongated leg structure to accommodate selective mounting of a supplemental component thereto via said coupler, and a stowed position of non-protruding relation to said distal end of the elongated leg structure.

According to a third aspect of the invention, there is provided a tripod yoke compatible with a cooperating set of tripod legs configured with ball-shaped proximal ends, said tripod yoke comprising:
  a yoke body comprising a central bore passing therethrough on a central axis thereof to accommodate insertion of said cooperating center-column through said central bore, and a set of three pockets distributed in circumferentially spaced fashion around said central bore and facing a common direction along said central axis for receipt therein of said ball-shaped ends of said tripod legs; and
  a multi-purpose tightening mechanism coupled to said yoke body, and configured for user-operation thereof in a multi-purpose tightening function configured to both tighten a captured state of said proximal ball-shaped ends of said tripod legs in said pockets of the yoke body, and achieve a secondary tethering of said tripod legs to the yoke body.

According to a fourth aspect of the invention, there is provided a tripod yoke compatible with a cooperating set of tripod legs configured with ball-shaped proximal ends, said tripod yoke comprising:
  a yoke body comprising a central bore passing therethrough on a central axis thereof, and a set of three pockets distributed in circumferentially spaced fashion around said central bore at an underside of the yoke body for receipt therein of said ball-shaped ends of said tripod legs; and
  an upper rotatable member residing above the yoke body;
  a connector passing through the central bore of the yoke body and engaged to the upper member via a threaded connection therebetween around the central axis;
  a lower clamp residing across the yoke body from the upper rotatable member and movably connected thereto by said connector, said clamp having three peripheral regions thereof that are positioned to respectively align with the three pockets of the yoke and are shaped relative thereto to enable capture of said ball-shaped proximal ends of the tripod legs between said pockets of the yoke body and said peripheral regions of the clamp;
  wherein rotation of the upper rotatable member in a tightening direction axially draws the clamp member toward the yoke body to clamp the ball-shaped proximal ends of the tripod legs against said pockets of the yoke body.

According to a fifth aspect of the invention, there is provided a tripod yoke compatible with a cooperating set of tripod legs configured with ball-shaped proximal ends, said tripod yoke comprising:
- a yoke body comprising a central bore passing therethrough on a central axis thereof, and a set of three pockets distributed in circumferentially spaced fashion around said central bore at an underside of the yoke body for receipt therein of said ball-shaped ends of said tripod legs; and
- an upper rotatable member residing above the yoke body and supported by a threaded connection whose threads are centered around the central axis;
- wherein the yoke body, at or proximate each pocket thereof, comprises a respective female retention bore for receipt of a respective male insertion member found on the respective tripod leg, said female retention bore penetrating from an interior of the pocket to a topside of the yoke body at a seating area thereof toward which the rotatable member is advanced under rotation thereof in a tightening direction around the central axis.

According to a sixth aspect of the invention, there is provided a tripod comprising:
- a tripod yoke comprising a central bore passing therethrough; and
- a set of tripod legs connected or connectable to said tripod yoke;
- wherein said tripod legs are shaped and configured for selective mating together in parallel and adjacent relation to one another to collectively form an externally round shaft of outer diameter matably insertable through a matching second tripod yoke via the central bore thereof.

According to a seventh aspect of the invention, there is provided a ball and socket joint comprising:
- a ball coupler having a ball tip with a spherically contoured exterior surface;
- a socket coupler having a spherically contoured receiving socket therein that is open at one end of the socket coupler to accept insertion of the ball tip of the ball coupler; and
- a retention mechanism operable to engage between the couplers when the ball tip is received in the socket coupler to resist separation of the couplers from one another, said retention mechanism comprising:
  - a male insertion member attached to a first one of the couplers;
  - a female conduit in a second one of the couplers into which the male insertion member is insertable;
  - a latching mechanism movable between a latching position blocking withdrawal of the male insertion member from the female conduit, and a release position allowing withdrawal of the male insertion member from the female conduit;
- wherein said latching mechanism comprises a depressible latch member having a lever arm disposed externally of a body of said second one of the couplers, and a catch tab reaching from said lever arm into an internal cavity of the body that is penetrated by the female conduit, said lever arm being biased into a default position placing the catch tab in said latching position, and being depressible out of said default position to move the catch tab into the release position.

According to an eighth aspect of the invention, there is provided a ball and socket joint comprising:
- a ball coupler having a ball tip with a spherically contoured exterior surface;
- a socket coupler having a spherically contoured receiving socket therein that is open at one end of the socket coupler to accept insertion of the ball tip of the ball coupler; and
- a retention mechanism operable to engage between the couplers when the ball tip is received in the socket coupler to resist separation of the couplers from one another, said retention mechanism comprising:
  - a male insertion member attached to a first one of the couplers;
  - a female conduit in a second one of the couplers into which the male insertion member is insertable;
  - a latching mechanism movable between a latching position blocking withdrawal of the male insertion member from the female conduit, and a release position allowing withdrawal of the male insertion member from the female conduit;
- wherein the female conduit penetrates fully through the body of said second one of the couplers, and the male insertion member has a length exceeding that of the female conduit so that a distal end of the male insertion member protrudes externally of the body of said second one of the couplers to enable visually confirmation of a fully inserted and latched state of said male insertion member.

According to a ninth aspect of the invention, there is provided a basal for a tripod leg comprising:
- a body comprising a proximal end connected, or configured for connection, to said tripod leg, and an opposing distal end for placement on a surface on which the tripod leg is to be magnetically supported; and
- a magnet mounted, recessed or embedded on or in said body at or adjacent said distal end of the body;
- wherein said distal end of the body, as viewed in an axial direction in which the proximal and distal ends there are spaced apart from one another, has a lobed shape whose outer perimeter comprises a lobed region of greater radial protrusion from an outer circumference of the magnet on one side thereof than on other sides thereof.

According to a tenth aspect of the invention, there is provided a basal for a tripod leg comprising:
- a proximal end connected, or configured for connection, to said tripod leg, and an opposing distal end for placement on a surface on which the tripod leg is to be supported;
- wherein said basal is of a multi-piece construction in which at least two pieces are composed of different respective constituent materials imparting distinct material properties to said at least two pieces, said multi-piece construction comprising a distal piece defining the distal end of said magnetic basal, a proximal piece defining the proximal end of said magnetic basal and a linking piece joining together said proximal coupler and said distal connector, said linking piece being composed of a constituent material of greater flexibility than the respective constituent material of each said distal and proximal pieces.

According to an eleventh aspect of the invention, there is provided a telescopic tube assembly comprising:
- an outer tubular member;
- an inner tubular member telescopically received in said outer tubular member for selective longitudinal displacement relative thereto on a longitudinal axis shared by said tubular members to adjust an amount of telescopic extension of said inner tubular member from said outer tubular member; and a locking mechanism selectively operable to lock said inner tubular member at a selected degree of telescopic extension from said outer tubular member;

wherein said locking mechanism comprises:
 a squeeze lever pivotally supported on the outer tubular member about a pivot axis lying transversely of said longitudinal axis, and being movable about said pivot axis between a locking position and a release position;
 at least one engagement feature projecting from the squeeze lever on an inner side thereof facing toward the tubular members;
 at least one engagement window in the outer tubular member that is positioned for penetration thereof by said at least one engagement feature in the locking position of the squeeze lever, in which said at least one engagement feature projects through said at least one engagement window into an annular space between said tubular members and thereby engage the inner tubular member and resist said longitudinal displacement thereof.

According to a twelfth aspect of the invention, there is provided a support system comprising:
 an elongated shaft; and
 a ring attachment mounted to said elongated shaft in a condition spanning circumferentially thereabout, and selectively slidable back and forth thereon along a longitudinal axis thereof, said ring attachment comprising:
  at least one coupler by which a separate accessory is selectively attachable to said ring attachment to carry said separate accessory on said elongated shaft; and
  a locking mechanism selectively operable between a locking condition preventing sliding movement of the ring attachment along said elongated shaft to hold said ring attachment at a selected position therealong, and a release condition allowing said sliding movement to relocate said ring attachment along said elongated shaft;
 further characterized by at least one of the following:
 (a) said support embodies a tripod, of which said elongated shaft is one three tripod legs;
 (b) said at least one coupler comprises at least one ball or socket coupler;
 (c) said at least one coupler comprises a plurality of couplers mounted at circumferentially spaced positions around the ring attachment; and/or
 (d) said locking mechanism comprises an externally threaded collet slidable on the elongated shaft in the released condition of said locking mechanism, and an internally threaded collar cooperably mated with the collet to effect tightening of the collet against a periphery of said elongated shaft under threaded advancement of the collar on the collet, thereby achieving the locking condition.

According to a thirteenth aspect of the invention, there is provided a support system comprising:
 an elongated shaft;
 an accessory mount removably supportable on said elongated shaft to removably carry an accessory thereon, said accessory mount comprising, at locations spaced apart from one another in a length direction of said accessory mount:
  a mating feature; and
  a coupling feature;
 a mounting arrangement supported on said shaft and configured for selective engagement thereof by the accessory mount to support said accessory mount on said elongated shaft, said mounting arrangement comprising, at locations spaced apart from one another in an axial direction of said elongated shaft:
  a mating element configured for selective mating engagement with the mating feature of the accessory mount by insertion of a male one of either said mating feature and said mating element into a female one of either said mating feature and said mating element; and
  a coupling element configured for selective coupling engagement with the coupling feature of the accessory mount by, after mating of the axial mating feature and the axial mating element into a mated condition with one another, tilting of the accessory mount toward the elongated shaft about a pivot point defined by said mated condition of the mating feature and the mating element.

According to a fourteenth aspect of the invention, there is provided a support system comprising:
 an elongated shaft; and
 a removable attachment that is selectively attachable and detachable to said shaft for use in removably carrying an accessory thereon;
 further characterized by at least one of the following:
 (a) the mounting arrangement and the elongated shaft each comprise a respective one of either (i) a set of one or more ribs running in the axial direction; and (ii) a set of one of more slots running in the axial direction, of which said slots are positioned and shaped to receive said one or more ribs therein when the removable attachment is attached to the elongated shaft to prevent relative rotation;
 (b) the removable attachment comprises two shaft attachment portions situated at axially spaced apart positions therealong and each arranged to embrace about at least 180-degrees about said elongated shaft, and said removable attachment comprise a narrower intermediate portion that is disposed between two shaft attachment portions and has a lesser angular span around the elongated shaft, whereby two removable attachments can be attached to the elongated shaft at opposing sides thereof in axially overlapping positions therealong with one of the attachment portions of one of said two removable attachments residing between the two attachment portions of the other of said two removable attachments;
 (c) the removable attachment is shaped to embrace less than a circumferential entirety of the elongated shaft, and said removable attachment is accompanied by a tether connectable to the removable attachment in a position spanning between two sides thereof across a circumferential remainder of the elongated shaft so that the removable attachment and the tether cooperably encircle said circumferential entirety of the elongated shaft.

According to a fifteenth aspect of the invention, there is provided a holder for a smartphone or tablet computer, said holder comprising:
 a base;
 a movable support residing above the base and supported thereon in an elevationally adjustable manner movable upwardly away from, and downwardly toward, said base in a height direction; and a first coupler that defines a first one of either a ball or a socket and is mounted to said movable support for selective coupling to a second coupler of a smartphone/tablet accessory on said smartphone or tablet computer, said second coupler defining a second one of either said ball or said socket such that said first and second couplers are matable to define a ball and socket joint supporting said smartphone/tablet accessory on the movable support in an angularly adjustable manner tiltable about multiple axes relative to said movable support.

According to a sixteenth aspect of the invention, there is provided a case for a smartphone or tablet computer, said case comprising a female socket therein comprising an interior of spherical concavity for mating with a ball coupler of externally spherical convexity on a separate smartphone/tablet holder in order to carry said case, and any smartphone or tablet held therein, on said smartphone/tablet holder in an angularly adjustable manner tiltable about multiple axes.

BRIEF DESCRIPTION OF THE DRAWINGS

One embodiment of the invention will now be described in conjunction with the accompanying drawings in which:

FIG. 1 illustrates a tripod from Applicant's aforementioned PCT application, and a cooperating set of bi-stable securement feet attachable to the three legs of the tripod at distal ends thereof opposite a yoke of the tripod that interconnects said legs.

FIG. 2 is a cross-sectional of one of the bi-stable securement feet of FIG. 1, as viewed in a longitudinal midplane thereof.

FIG. 3 is a top perspective view of a miniature dual-purpose tripod of the present invention having a set of doglegged tripod legs, shown in non-mating divergent relation to one another in a tripod mode of said dual purpose tripod.

FIG. 4 is another top perspective view of the miniature dual-purpose tripod of FIG. 3, but with the doglegged tripod legs shown mating relation to one another in a selfie-stick mode of said dual-purpose tripod.

FIG. 5 is a partial cross-sectional view of the miniature dual-purpose tripod of FIG. 4, as viewed along line A-A thereof.

FIG. 5A is another partial cross-sectional view of the miniature dual-purpose tripod of FIG. 5, but with select components thereof omitted for illustrative purpose.

FIG. 6 is another partial cross-sectional view of the miniature dual-purpose tripod of FIG. 4 as viewed along line B-B thereof.

FIG. 7 is a side view of one of the doglegged tripod legs of the miniature dual-purpose tripod of FIG. 3.

FIG. 8 is a perspective view of the doglegged tripod leg of FIG. 6, as viewed from an inner side thereof.

FIG. 9 is a cross-sectional view of the doglegged tripod leg of FIG. 6, as viewed along line A-A thereof.

FIG. 10 is a bottom perspective view of a yoke body of the miniature dual-purpose tripod of FIG. 3.

FIG. 11 is top perspective view of a yoke clamp of the miniature dual-purpose tripod of FIG. 3.

FIG. 12A is a side perspective view of a yoke sleeve of the miniature dual-purpose tripod of FIG. 3.

FIG. 12B is another side perspective view of the yoke sleeve of FIG. 12A from an opposing side thereof.

FIG. 13 illustrates a ball coupler for coupling a bi-stable securement foot to one of the tripod legs.

FIGS. 14A and 14B illustrate assembly of two of the tripods together with at least one thereof in its self-stick mode to serve as a self-stick extension or tripod center column on the other tripod.

FIG. 15 illustrates a bi-stable securement foot of the present invention with an added latching mechanism for preventing decoupling between the bi-stable securement foot and the ball coupler of FIG. 13.

FIG. 16A is an exploded cross-sectional view illustrating coupling together of the bi-stable securement foot of FIG. 15 with the ball coupler of FIG. 13.

FIG. 16B is an assembled cross-sectional view of the bi-stable securement foot and ball coupler of FIG. 16A once coupled together, where a string-of-pearls insertion member on the ball coupler is latched by the latching mechanism of the securement foot.

FIG. 16C is a cross-sectional view of the bi-stable securement foot of FIG. 16A as viewed along line C-C thereof to show a key-slotted catch tab of the latching mechanism.

FIG. 17 is a cross-sectional view of the same tripod yoke as FIG. 6 in the same viewing plane, but in use with a modified tripod leg featuring the same string-of-pearls insertion member as the ball coupler of FIGS. 13, 16A and 16B for use in secondary retention of the tripod leg to the yoke.

FIG. 18A is a perspective view of a magnetic basal attachment usable on any tripod leg as an alternative to the securement feet shown in FIGS. 1, 2 and 15.

FIG. 18B is a cross-sectional view of the magnetic basal attachment of FIG. 18A as viewed along line B-B thereof.

FIG. 18C is a cross-sectional view of the magnetic basal attachment of FIG. 18A as viewed along line C-C thereof.

FIG. 19 is a perspective view of an inventive locking mechanism installed at the telescopic interface of two tubular sections of a telescopically adjustable tripod leg, with the locking mechanism shown in a release position allowing telescopic adjustment of the leg.

FIG. 19A is another perspective view of the locking mechanism of FIG. 19, but cross-sectioned in a radial plane denoted by line A-A thereof.

FIG. 19B is an elevational view the locking mechanism of FIG. 19, cross-sectioned in an axial plane lying diametrically of the two tubular sections of the tripod leg.

FIG. 20 is a perspective view of the locking mechanism of FIG. 19, but in a locking position preventing telescopic adjustment of the leg.

FIG. 20A is another perspective view of the locking mechanism of FIG. 20, but cross-sectioned in a radial plane denoted by line A-A thereof.

FIG. 20B is a cross-sectional view of the locking mechanism of FIG. 20 as viewed in the same axial plane as FIG. 19B.

FIG. 21A is a perspective view of a tubular section of a tripod leg illustrating installation thereon of a slidable/rotatable ring attachment featuring a set of ball couplers by which other components or accessories are selectively connectable to the tripod leg at various positions thereon.

FIG. 21B is a close-up perspective view of the ring attachment of FIG. 21A thereof, with a tightenable lock collar thereof removed for illustrative purpose.

FIG. 21C is a cross-sectional view of the ring attachment of FIG. 21A as cross-sectioned along line C-C thereof.

FIG. 22A is an exploded perspective view of a two-part accessory mounting system for removable mounting of an accessory to a tubular section of a tripod leg in an alternative fashion to the ring attachment of FIG. 21.

FIG. 22B is an assembled perspective view of the two-part accessory mounting system of FIG. 22A from the same side thereof.

FIG. 22C is another exploded perspective view of the two-part accessory mounting system of FIG. 22A, but from an opposing side thereof.

FIG. 22D is another assembled perspective view of the two-part accessory mounting system of FIG. 22B, but from an opposing side thereof.

FIG. 23A is an elevational side view illustrating a first step for coupling together the two parts of the accessory mounting system of FIG. 22.

FIG. 23B is an elevational side view illustrating a second step for coupling together the two parts of the accessory mounting system of FIG. 22.

FIG. 24 is a perspective view illustrating one part of the two-part accessory mounting system of FIGS. 22 and 23 installed on a tubular section of a tripod leg in a position ready for coupling of the second part thereto.

FIG. 27A is an exploded cross-sectional view illustrating a variant of the coupling arrangement shown in FIG. 16.

FIG. 27B is partially assembled cross-sectional view of the coupling arrangement of FIG. 27A.

FIG. 27C is a fully assembled cross-sectional view of the coupling arrangement of FIG. 27B.

DETAILED DESCRIPTION

Figure 25:
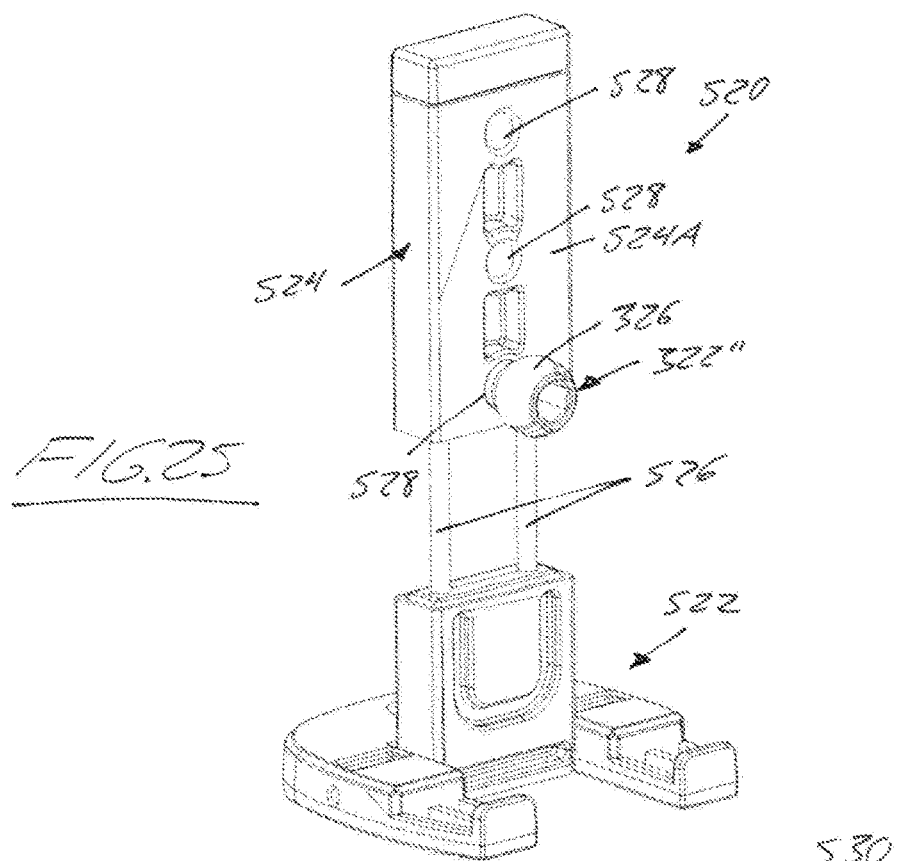
FIG. 25 is a perspective view of a smartphone/tablet holder of the present invention.

FIG. 1 illustrates a tripod assembly 100 featuring a set of three tripod legs 102 and a cooperating tripod yoke 104 by which the legs are connectable together. A lower or distal foot end of each tripod leg 102 features a ball coupler 106 selectively matable in snap-fit fashion with a socket coupler 22 of a respective securement device 10, more details of which are shown in FIG. 2. A set of three securement devices 10 can serve as attachable/detachable tripod securement feet to support the tripod on various surfaces and objects. Through rotational movement allowed in three dimensions between ball tip of each ball coupler 106 and the receiving socket 32 of the mating socket coupler 22, and through the limited angular flex allowed between the socket coupler 22 and the proximal end of the securement device's spring band 12, the relative angle of the securement device 10 to the tripod leg 102 can be varied in three dimensions to best suit the particular surface(s) on which the tripod is to be supported. The snug snap-fit relation between the ball and socket couplers will serve to maintain the selected orientation absent the application a sufficient external adjustment force to overcome this frictional fit between the couplers.

Each securement device comprises at least one bi-stable spring band 12, a resiliently flexible outer skin 14 encapsulating an entirety of the bi-stable spring band, a plurality of preferably magnetic embedments 18, 18a, 18b secured to the bi-stable spring band 12 and encapsulated fully within the flexible outer skin 14 in sandwiched relation between the spring band and the outer skin 14, an optional reinforcement layer 20 embedded within the outer skin 14, a socket coupler 22 situated at a proximal end of the securement device 10, and an internal stiffener/dampener 24 in the form of a hollow member 30 connected between the socket coupler 22 and a proximal end of the spring band 12 nearest thereto, and filled with a flowable substance, which may be of gaseous, liquid, gelled or granular-solid composition. Optionally, an exterior surface area of the outer skin 14 at each of the discrete locations occupied by the embedments may feature an annular lip 26 raised up from surrounding regions of the skin's exterior surface to create a cup-shaped frill delimiting a recessed cavity within the confines of the lip 26 so that these frilled areas of the outer skin 14 form integrally-defined suction cups by which securement of the device 10 to smoothly surfaced objects can be improved.

The spring band 12 imparts a bi-stable shape characteristic to the overall securement device 10, whereby the securement device is switchable between a linear state in which the device's longitudinal axis $A_L$ follows a flat linear path over the entire length of the spring band, and a coiled state in which the device's longitudinal axis $A_L$, over the entire length of the spring band, follows a spirally curved path about the transverse coil axis. The composition, firmness and thickness of the skin are selected so that the skin provides resistance to self-winding action of the spring when snapped out of its linear state, thus retarding, but not fully stopping, the self-winding action.

With magnetic embedments, one or more of the securement devices can be used in their flattened linear state with the embedment-equipped side thereof placed against relatively flat surfaces of one or more ferromagnetic objects, where the magnetic embedments, the frictional sliding resistance of the outer skin 14 and the optional suction cup frills and/or dry adhesive (if included) cooperatively secure the securement devices in stable anchored positions on the ferromagnetic object(s). Exemplary uses of this type include mounting of cameras to vehicles, for example on door, hood, roof or body panel surfaces thereof. One or more of the securement devices can also be used in their coiled state to secure their respective tripod legs to one or more objects (hand rails, lamp posts, etc.) in a wrap-around fashion where the securement devices coil fully or partially around such objects. In the event that the object is ferromagnetic, the optional use of magnetic embedments enhances the securement strength to the object by supplementing the coiled frictional contact of the securement device's outer skin with the object it is wrapping around. The securement device can also adopt a compound state having part of the device's length disposed in the linear state, for example to conform against a relatively flat surface, and another part of the device's length disposed in the coiled state, for example to conform against a neighbouring or adjoining curved surface, or transition between two differently oriented surfaces, or form an enlargement to block pulling of the linear portion of a crack or gap of a structure through which the portion extends. In another exemplary use, in the device's coiled state, it can be squeezed from opposing sides to fit into such gap or crack, whereupon it will expand back toward its normal outer coil diameter, thus applying frictional pressure against opposing sides of the gap or crack and thereby holding itself in place.

The yoke 104 features a hub from which three connection stubs 132 angle downwardly for respective connection to the three tripod legs 102. Each connection stub 132 includes a socket coupler of compatible size to accomplish snap-fit relation with a ball coupler 112 on an proximal end of the respective tripod leg to form a ball and socket joint therewith in the same manner described above in relation to the securement devices 10 and the distal end ball couplers 106 of the tripod legs 102. An additional stabilizing mechanism is included to allow the user to selectively lock each tripod leg 102 in co-axial alignment with the respective connection stub 132 to prevent relative tilting therebetween at the mated ball and socket joint. Each connection stub 132 may be pivotally pinned to the hub of the yoke to allow angular adjustment therebetween about a singular pivot axis, and may include a detent mechanism by which the connection stub can be selectively locked at one of a plurality of predetermined angles about said pivot axis. In such embodiments, a first degree of single-axis angular adjustment is attainable between the hub and each connection stub, and a second degree of multi-axis angular adjustment in three dimensions is attainable via the ball and socket joint between the connection stub and respective tripod leg 102.

The stabilization mechanism features external splines 134 and a rotatable externally threaded ring 138 on the proximal section of the tripod leg 102 below the ball tip of the leg's proximal end ball coupler, and a sliding stabilization sleeve 136 externally disposed around the connection stub 132 and featuring an internally splined area matable in co-meshing relation with the external splines on the leg 102. The sleeve is lowered from an initial retracted position into an extended stabilizing position reaching downwardly past the mated-together ball and socket of the leg 102 and connection stub 132. The sleeve 136 is then secured in this extended position by rotatably engaging the externally threaded ring 138 with the internally threaded lower end of the stabilization sleeve. The meshed together splines block relative rotation and tilting between the tripod legs 102 and the connection stubs 132 of the tripod yoke 104.

The tripod 100 optionally includes a center column 112, which extends upwardly through a central bore of the tripod yoke 104 to stand upright therefrom to hold a camera or other piece of equipment atop the center column in elevated relation from the yoke 104. The top end of the center column 112 may feature a ball coupler 112' that can serve as a respective half of a ball mount, the cooperating half (not shown) of which is a camera base plate whose topside features a standardized thread shaft (e.g. ¼-20 screw) for threaded mounting of a camera thereto, and whose underside features either a large female socket for fitting over the ball shaped exterior of the dual-purpose coupler 112' of the center column. The ball coupler 112' may be a dual-mode ball coupler capable of serving as both a relatively large ball coupler and a relatively small socket coupler, thus having a spherically contoured exterior surface 112a with an outer diameter of a first larger size compatible with the relatively large socket couplers, and a concavely and spherically contoured interior socket 112b that is open at the terminal end of the coupler 112' and has a smaller diameter of a second smaller size compatible with relatively small ball couplers. In such case, the camera base plate may instead have a small male ball for insertion into the interior socket of the dual-mode coupler 112' of the center column.

Each tripod leg 102, which in the illustrated example features three telescopically mated leg sections of larger to smaller cross-sectional size moving from the a proximal yoke end of the leg to the distal foot end thereof, is selectively lockable at a selected degree of collapse/extension by a conventional rotatable locking collar 120a, 120b operable between each pair of mating telescopic sections. Each leg section of each tripod leg features at least one threaded connection port 122a, 122 by which one or more selectively attachable ball couplers are attachable. As shown in FIG. 13, each such ball coupler has at least one ball-tip and a threaded base portion comprising an externally threaded stem projecting axially from the ball tip for threaded mating with a selected one of the threaded connection ports 122a, 122b.

Turning now from FIGS. 1 to 2, in which the tripod and securement devices are of the type disclosed in Applicant's aforementioned PCT application, FIGS. 3 to 12 instead illustrate a tripod 200 of the present invention, featuring a unique yoke and leg structure having novel structure and functionality lacking in the earlier design and any prior art known to the Applicant. The tripod again features a set of three legs 202 removably coupled to a yoke 204 by way of respective ball and socket connections that allow pivoting of the legs 202 relative to the yoke and one another about three orthogonal axes, but the structure of both the yoke and the legs differ from those described for FIGS. 1 and 2.

The yoke has a multi-piece construction composed of a primary yoke body 206, an upper collar 208, a lower clamp 210 and a hollow sleeve 212. The clamping body 206, shown in isolation in FIG. 10, has a ring-like structure spanning circumferentially around a central bore 214, and in the illustrated example has a tri-lobed outer periphery having three convex three lobes 216 that each extend radially further from a central axis $A_C$ of the yoke 204 than three concave inter-lobe regions 218 disposed between the three lobes. At each of the lobes 216A, 216B, 216C, the yoke body features a respective pocket 220 recessed upwardly into the underside of the yoke body. Each pocket 220 has having an upper boundary 221 surface of spherically concave curvature. The topside of the yoke body 206 features an annular wall 222 spanning in concentric relation around the central axis $A_C$ at the outer circumference of an annular seating ledge 224 that spans around the central bore 214 in a plane normal to said central axis to define an annular seating area for receiving the annular bottom end of the upper collar 208 when threaded into a locking position, described in more detail further below. The annular wall 222 thus spans circumferentially around the bottom end of the upper collar 208 when seated against the ledge 224 in this locking position.

The lower clamp 210, shown in isolation in FIG. 11, also has a ring-like structure spanning circumferentially around a central opening 226, which is centered on the same central axis AC as the central bore 214 of the yoke body, and therefore aligns therewith in the assembled state of the yoke 204. The outer periphery of the lower clamp 210 has three concave socket regions 228 whose positions around the central axis AC are spaced apart in equivalent fashion to the three lobes 216 and three pockets 220 of the yoke body 206. In the assembled state of the yoke 204, each concave socket region 228 of the lower clamp 210 aligns with a respective one of the pockets 220 at the three lobes 216 of the yoke body 206. Each peripheral socket region 228 of the lower clamp 210 has an upper wall 230 of concavely arcuate curvature facing outwardly away from the central axis $A_C$, and a split lower wall 232 of concavely spherical curvature upwardly and outwardly away from the central axis $A_C$. The split characterization of the lower wall is due to the presence of a central slot 234 that lies radially of the central axis $A_C$ and divides this spherically contoured lower wall into two equal halves, that are symmetric to one another across a radial plane that emanates from the central axis and bisects the given socket region 228 of the lower clamp's outer periphery. Three inter-socket regions 236 defining a remainder of the lower clamp's periphery between the concave socket regions 228 thereof are of lesser concavity than the socket regions, and have a more subtle concave curvature that generally conforms to the inter-lobe regions 218 of the yoke body 206.

One of the inter-socket regions 236 of the lower clamp 210 features an internally threaded boss 238 projecting outward therefrom in radial relation to the central axis $A_C$. A respective one of the inter-lobe regions 218 of the yoke body 206 features a corresponding cut-out 240 recessed upwardly thereinto to accommodate the boss 238 so that the boss 238 can protrude through this cut-out 240 in the assembled state of the yoke 204 to allow access to the radially outermost end of the boss 238 in the assembled state of the yoke, in which a substantial height of each inter-socket region 236 is nested within the underside of the yoke body 204 behind the wall structure of the respective inter-lobe region 218 thereof.

In the assembled state of the yoke 204, the hollow sleeve 212 of the yoke 204 passes concentrically through and the central opening 226 of the lower clamp and the central bore 214 of the yoke body 206 from the underside of the lower clamp, and reaches upwardly beyond the top end of the yoke body, past the annular wall 222 thereof. An upper portion of the sleeve 212 residing above the annular seating ledge 224 includes a lower threaded section 242 residing nearest to the yoke body, and an a non-threaded upper section 244 residing further from the yoke body and nearer to a terminal upper end 212A of the sleeve 212. The threaded section 242 has external threading thereon, while the non-threaded section 244 has a set of resiliently flexible stop tabs 246 carried thereon, of which there are two in the illustrated embodiment, though the quantity may vary. Each stop tab 246 is integrally joined with the circumferential wall of the sleeve at a top end of the tab, while a remainder of the tab is physically separated from the circumferential sleeve wall by a U-shaped slot therein that penetrates through the wall and surround the tab's two sides and bottom end. On an outer side the tab facing the sleeve exterior, the bottom end of each stop tab 246 features a protruding tip 246A that projects radially beyond the smooth-walled exterior remainder of the non-threaded section, and radially beyond the crest diameter (major diameter) of the underlying threaded section 242.

From the externally threaded section 242, a lower portion of the sleeve 212 reaches downwardly through the central bore 214 of the yoke, and onwardly through the central opening 226 of the lower clamp 210. At the underside of the lower clamp 210, a terminal bottom end 212B of the sleeve 212 features an out-turned flange 248 that hooks the underside of the lower clamp 210, in the illustrated example at a recessed outer stop ledge 249 of the central opening 226 so that the flanged bottom end 212B of the sleeve sits flush with surrounding bottommost surface of the clamp 210. This hooked engagement of the flange 248 with the underside of the clamp prevents upward withdrawal of the sleeve 212 upwardly therefrom. To prevent downwardly displacement of the sleeve 212 from the central opening 226 of the clamp 210, a catch tab 250 is provided on the lower portion of the sleeve. The catch tab is an integral part of the sleeve, just like the stop tabs 246, but is inverted relative to the catch tabs so that its lower end attached to the sleeve's circumferential wall, and its upper end carries the externally protruding feature. In this case, the protruding feature is a catch tang 250A that hooks over a localized catch shoulder 252 provided at the top of the clamp 210 at a localized position around the circumference of the central opening 226.

On the exterior circumference of the sleeve's lower portion, at two diametrically opposed positions angularly offset from the catch tab 250, the sleeve features to radially protruding and axially extending guide ribs 254, which during assembly of the yoke 204 are slid upwardly into a match pair of diametrically opposed guide channels 256 that are radially recessed into the boundary wall of the central opening 226 at positions offset from the catch shoulder 252 by an equal angular distance. During such sliding insertion of the sleeve 212 into the clamp 210 from the underside thereof, the catch tab 250 is initially flexed inwardly from its normal position to a deflected position in which the catch tang 250A no longer protrudes from the sleeve interior, and only once the catch tab 250 reaches the catch shoulder 252 at the top of the clamp does it pop back out to its normal position to engage over said catch shoulder. This coincides with arrival of the out-turned bottom flange 248 at the underside of the clamp 210, as the axial distance between the annular stop ledge 249 at the underside of the clamp and the localized catch shoulder 252 at the topside of the clamp is generally equal to the axial distance between the bottom out-turned flange 248 of the sleeve 212 and the catch tang 250A thereof. Accordingly, the clamp 210 becomes axially captured between the out-turned bottom flange 248 and catch tang 250A of the sleeve 212 to axially lock the clamp and sleeve together. Meanwhile, the receipt of the guide ribs 254 in the guide channels 256 and by the receipt of the catch tang 250A in the located catch shoulder rotationally lock the clamp and sleeve together. Accordingly, the sleeve and clamp are engaged together for movement as a singular assembled unit.

With the sleeve and clamp unit assembled, the upper portion of the sleeve is then slid upwardly through the central bore 214 of the yoke body 214, and a compression spring 260 is slid over the top end 212A of the sleeve 212, and seated onto an inwardly jutting support shoulder 262 situated inside the central bore 214 of the yoke body at an elevation below the annular seating ledge 224. Next the upper collar 208 is then lowered over the top end 212B of the sleeve 212, as enabled by an axial bore 264 of the collar 208 that passes fully therethrough on the same central axis $A_C$ shared by the central bore 214 and central opening 226 of the yoke body 206 and lower clamp 210. The axial bore 264 has a smooth-walled upper section 266 where the boundary wall of the bore is not threaded, and in the illustrated example is tapered in diameter in a downward direction along the central axis. Below the smooth-walled upper section 266 is an internally threaded middle section 268, whose internal threads are matably compatible with the external threads of the sleeve's threaded section 242. Below the internally threaded section 268 of the collar 208 is a counterbored bottom section 270 where the axial throughbore 264 of the collar 208 is of greater diameter than the overlying threaded middle section 268. The transition in diameter between these two sections defines an inwardly jutting spring shoulder 272 against which the top end of the compression spring 260 pushes upwardly on the collar 208.

The collar 208 is threaded onto the sleeve 212 at the threaded section thereof, thereby retaining the upper collar 208 in a position above the yoke body 204 across from the lower clamp 210 situated below the yoke body. The outer diameter of the upper collar 208 at the bottom end thereof exceeds the diameter of the yoke body's central bore at the upper end thereof, but is less than the inner diameter of the annular wall 222 standing upright around the central bore, whereby downward advancement of the upper collar 208 on the external threads of the hollow sleeve 212 under rotation of the upper collar 208 in a tightening direction toward the yoke body is limited by eventual contact of the collar's bottom end against the seating ledge 224 of the yoke body. As shown, the external periphery of the collar 208 may be scalloped for improved manual grip by a user during rotation of the collar in said tightening direction, and a reversed loosening direction retracting the collar upwardly away from the yoke body. The stop tabs 246 prevent inadvertent removal of the collar 208 from the sleeve 212 when rotated in the loosening direction, as sufficient upward displacement of the collar 208 relative to the sleeve under such rotation will eventually bring the internally threaded section 268 of the collar up to the bottom ends of the stop tabs 246, where the radially protruding tip 246a of each stop tab 246 interferes with the crest diameter (minor diameter) of the collar's internal threading, thus resisting further upward movement of the collar 208. The user can feel this newly added resistance to continued loosening of the collar 208, and in response thereto, can either stop loosening the collar 208 to prevent removal thereof if that is not the user's intent, or can continue removal of the collar 208 by exertion of sufficient force causing the stop tabs to flex inwardly so that their protruding tips 246 ride over the thread crests of the collar's threaded section 268. If the user' doesn't recognize the initial resistance, then the skipping of the resiliently flexible stop tabs over sequential crests of the collar's threaded section will create a clicking sound audibly informing the user's that continued loosening of the collar will result in separation thereof from the sleeve 212. The yoke can thus optionally be disassembled at the user's discretion, though audible and tactile warning to the user is given before actual removal of the collar 208 to prevent inadvertent removal thereof.

Having described main componentry of the yoke 204, attention is now turned to the legs 202 of the tripod 200, one of which is shown in isolation in FIGS. 7 through 9. The three legs are preferably identical in construction, and so in the interest of brevity, any description made of one leg may likewise apply to all others, without explicit repetition of the common structure shared thereby. Each leg 202 has a ball-shaped proximal end 280 for coupling with the yoke 204, and an opposing distal end 282 residing oppositely of said ball-shaped proximal end 280 on a linear reference axis $A_R$. The ball-shaped proximal end has an exterior of spherically convex curvature for use in forming a ball-and-socket joint with the yoke in a manner described in more detail further below. As shown, the spherical exterior shape of the ball-shaped proximal end 280 may be truncated in planar fashion at an ultimate proximal terminus of the leg, giving the ball-shaped proximal end an overall frusto-spherical shape. In the illustrated embodiment, instead of having a ball-shaped configuration like the proximal end to integrally form part of a ball- and socket connection with another component or accessory, the distal end 282 is composed of a pair of rounded lugs 284 by which a separate coupler 312 is movably attached to the leg, as described in more detail below.

Between its proximal and distal ends 280, 282, the leg 202 is not of a purely linear construction like a conventional tripod legs, where a singular linear section defines the entire length of the leg and lies directly on the linear reference axis $A_R$ that separates the proximal and distal ends. Instead, the leg 202 of the present embodiment is of a doglegged configuration having of a series of angularly distinct segments that are of non-parallel relation to one another, and non-parallel relation to said reference axis. The segments include a hand-grip segment 286 and a jointing segment 288, of which the hand-grip segment resides nearer to the distal end 282 of the leg, while the jointing segment resides nearer to the ball-shaped proximal end 280 of the leg and serves to join together the hand-grip segment and the ball-shaped proximal end 280. The hand-grip segment 286 spans predominantly along a linear hand-grip axis $A_H$, and the joining segment 288 spans predominantly along a linear joining axis $A_J$. Joining axis $A_J$ lies at an acutely oblique angle $\alpha$ to the linear reference axis $A_R$, and hand-grip axis lies at an obtusely oblique $\beta$ angle to the jointing axis and at an acutely oblique angle $\phi$ to the linear reference axis. These three angles form the three vertices of a scalene triangle whose three sides are denoted by the reference, joining and hand-grip axes. The hand-grip segment spans a majority of the leg's overall length, with the joining segment being substantially shorter, preferably having a length less than half of that of the hand-grip segment, and approximately one-third of the length thereof in the illustrated example.

As best shown in FIG. 5A, each spherically concave pocket 220 in the underside of the yoke body 204 cooperates with the corresponding socket region 228 of the lower clamp 210 aligned therewith to collectively form a spherically concave socket 290 to receive the ball-shaped end 280 of a respective one of the tripod legs 202. An open mouth 290A of the socket 290 is defined at a bottom end thereof between the radially outermost limit (relative to the central axis $A_C$) of the upper boundary surface 221 of the yoke body pocket 220 and the radially outermost limit of the split lower wall 232 of the clamp's respective socket region 228. This open mouth 290A of the socket accommodates insertion of the ball-shaped end 280 of the leg 202 during assembly of the tripod. The socket mouth 290A resides in an inclined plane that slopes upwardly and outwardly from the central axis AC at an acutely oblique angle thereto, whereby the mouth opens in a downward and outward orientation.

In a sufficient loosened state of the rotatable upper collar 208 on the threads of the hollow sleeve 212, the collar 208 can be axially depressed toward the topside of the yoke body 204, against the upwardly biasing spring force of the compression spring 260, which axially displaces the lower clamp 210 downwardly away from the underside of the yoke body 204, thus increasing the size of each socket 290 and the respective mouth 290A thereof. This is referred to as an open state of the yoke, where the size of each socket mouth 290A exceeds the diameter of the ball-shaped proximal end 280 of each tripod leg 202 to enable insertion of the ball-shaped end 280 of the tripod leg into the socket 290. Once the ball-shaped end of each tripod leg is received in the respective socket, release of the depression force on the collar 208 will allow the compression spring 260 to drive the collar upwardly, pulling with it the sleeve 212 and attached lower clamp, thereby reducing the size of each socket 290 and its mouth 290A in order to capture the ball-shaped proximal end 280 of each leg 202 inside the socket 290 between the spherically contoured boundary surface 221 and split lower wall 232 thereof (collectively, referred to as the rounded surfaces of the socket).

The collar 208 can then be rotated in the tightening direction advancing it toward the yoke body on the threaded sleeve 212 against the spring force, which acts to pull the lower clamp further upwardly toward the underside of the yoke body. Such tightening acts to apply clamping pressure to the captured ball-shaped proximal end 280 of each tripod leg 202 between the rounded surfaces of the yoke body and lower clamp, thus tightening the ball and socket joint between the yoke and the leg. When the yoke is in a loosened, but not open, state, each leg is pivotable relative to the yoke about three orthogonal axes to allow the legs to be set as user-desired positions relative to the yoke, whereafter the collar is then fully tightened down against the seating ledge 204 of the yoke body to achieve the maximum clamping pressure on the ball-shaped ends tripod legs, thereby effectively locking the legs at their user-selected positions. The rotatable upper collar 208, the hollow sleeve 212 threaded thereto and the lower clamp carried by the hollow sleeve thus collectively define a tightening mechanism operable to frictionally secure the ball-shaped proximal ends in static positions, thereby effectively locking the three tripod legs in place.

At the same time, the use of a hollow sleeve 212 as a connector between the rotatable upper collar that serves as the user-operated actuator of the tightening mechanism allows a center column (see 112 of FIG. 1) to be used with the tripod, by accepting insertion of such center column through the central opening 226 of the clamp 210 and the aligned bores 214, 264 of the yoke body 204 and upper collar 208 via the hollow interior of the sleeve 212. When the position of the center column 112 is set to a user-desired degree of upward protrusion from the yoke body and upper collar according to the desired height at which the user wishes to mount a camera or other piece of equipment to the center column, a lateral clamping member 292 is employed to hold the center column 112 at this user-selected position via a clamping action exerted on a side of the center column.

The lateral clamping member 292 of the illustrated embodiment is hand screw having a threaded shaft 292A engaged in the threaded boss 238 of the lower clamp 210, and a gripping knob 292B affixed to the threaded shaft at an external end thereof residing outside the yoke. Inside the central opening 226 of the lower clamp 210 at a positioned aligned with the threaded bore of the boss 238, the bottom portion of the sleeve 212 features a resiliently flexible clamping tab 294 integrally formed in the circumferential wall of the sleeve, in the same manner as the stop tabs 246, at an angularly offset position from both the catch tab 250 and the guide ribs 254, for example at a location residing diametrically opposite the catch tab 250. On rotation of the gripping knob 292B in tightening direction, the threaded shaft 292A of the lateral clamping advances further through the threaded boss 238 into the central opening 226 of the lower clamp 210, where an interior end of the threaded shaft 292 pushes inwardly against the clamping tab 294 at or near a free lower end thereof opposite its supported upper end that is integrally connected to the wall of the sleeve 212.

In the illustrated example, the threaded shaft 292A pushes indirectly on the clamping tab 294 via an intermediary force plate 296 that is axially captured between the out-turned flange 248 of the sleeve 248 and a protruding retainer 298 on the outside of the clamping tab 294. In the illustrated example, the clamping tab 294 is thinner than the circumferential wall of the sleeve 212, and the force plate 296 is circumferentially captured between opposing sides of the window of the sleeve wall in which the thinner clamping tab 294 resides. Tightening of the lateral clamping members thus drives the free bottom end of the clamping tab 294 into the hollow interior of the sleeve 212 and against the center column 112 at the side thereof facing the clamping tab 294, threaded boss 238 and lateral clamping member 292, thus clamping the center column between the clamping tab 294 and the opposing side of the sleeve in order to lock the center column at its user-selected position.

FIG. 4 shows the tripod 200 with all three legs 202 in matching first positions in which the hand grip segments 286 thereof are mated together in parallel and adjacent relation to one another, and are collectively centered on the central axis $A_C$ to span downwardly therealong in parallel relation thereto, thereby collectively forming a selfie-stick shaft by which the yoke can be manually carried. With reference to FIG. 9, an outer surface 300 of the hand-grip segment 286 each leg 202 that faces radially outward from the central axis $A_C$ is of convexly arcuate shape, with an angular span of approximately 120-degrees, whereby the outer sides of the three legs 202 collectively span a substantially full 360-degree span around the central axis, thereby forming a cylindrical exterior of the collectively defined self-stick shaft.

As also shown in FIG. 9, the hand-grip segment 286 of each leg 202 has a pair of detent features situated on opposing sides of the leg, namely a male detent 302 at one end and a female detent 304 at the other. Each detent 302, 304 faces a direction of generally tangential relation to the arcuate outer shape of the leg at a terminus thereof on the respective side of the leg. That is, male detent 302 protrudes on male detent axis $A_M$ of parallel relation to a first tangential axis $A_{T1}$ of the leg's arcuate outer shape at a first side of the leg, and female detent 304 is recessed in female detent axis $A_F$ of parallel relation to a second tangential axis $A_{T2}$ of the leg's arcuate outer shape at a second side of the leg. The detent axes are thus of symmetric relation to one another across a reference plane $P_R$ that bisects the arcuate exterior of the leg and contains the reference, hand-grip and joining axes $A_R$, $A_H$, $A_J$. The location along the hand-grip segment at which the detent pair resides is the same for all three legs, for example near the elbow 306 where the hand-grip and joining segments 286, 288 meet. As a result, when the three legs 202 are mated together in their first positions (their selfie-stick positions), the male detent 302 of each leg 202 mates with the female detent 304 of the neighbouring leg. The receipt of the male detents in the female detents blocks relatively sliding between the mated together hand-grip segments of the different legs along the central axis $A_C$, whereby even if the yoke is not fully tightened, pivotal movement of any leg about its ball and socket joint with the yoke is prevented by the mated condition of the detents, and so the legs are locked in their predetermined axial orientation relative to the yoke so long as the hand-grip segments are held together in detent-mated fashion in the user's hand.

In the illustrated embodiment, the collectively-formed selfie-stick is not purely cylindrical in shape over its entire length, as the hand-grip portion of each leg in the illustrated embodiment is composed of two subsegments, a proximal subsegment 286A that resides nearest to the proximal end 280 of the leg and is of linear shape defining hand-grip axis $A_H$, and a distal subsegment 286B that resides nearest to the distal end 282 of the leg 202, and deviates slightly from hand-grip axis $A_H$ and has a slightly lesser acute angle θ to reference axis $A_R$. The distal subsegment 286B is tapered in width toward the distal end 282 of the leg, unlike the uniform width possessed by the proximal subsegment 286A. As a result, when the legs are mated together in their first selfie-stick positions, the collectively formed selfie-stick shaft is of uniform outer diameter over the axial span of the proximal subsegments 286A, but is of tapered outer diameter over the axial span of the distal subsegments 286B. In their first selfie-stick positions, the joining segments 286 of the legs 202 angle upwardly and outwardly away from one another and from the central axis AC to join the collectively formed selfie-stick shaft to the ball and socket joints that are cooperatively formed at a radial distance outward from the central axis by the receipt of the ball-shaped proximal ends 280 of the legs in the sockets 290 of the yoke 204.

When the tripod is to be used in self-standing tripod fashion, rather than in hand-held selfie-stick fashion, then the legs 202 can simply be pivoted outwardly away from their mated-together first positions, subject to sufficient loosening of the tightening mechanism, into diverging second positions of any variety of different angular orientations to one another, as enabled by the multi-axis ball and socket joints. In the illustrated embodiment, to help proper alignment of the legs as they are moved into their first self-stick positions, the joining segment 286 features a central alignment rib 308 that resides in the aforementioned reference plane $P_R$ and is received in the slot 234 of the split lower wall 232 of the respective socket 290 of the yoke when the leg 202 is placed in the first self-stick position. As seen in FIG. 11, this slot 234 is tapered in width toward the central axis AC of the yoke 204 to guide the alignment rib 308 into proper radial alignment to the central axis AC as the leg is folded inwardly theretoward. The alignment rib 308 spans a partial length of the joining segment 288, starting at a neck 310 thereof that attaches to the ball-shaped proximal end, but stopping significantly short of, the elbow 306 that joins with the hand-grip segment 286. The ball-shaped proximal end may be considered divided into first and second hemispheres by a first diametrical plane parallel to the hand-grip axis $A_H$ and perpendicular to the reference plane $P_R$, with first hemisphere being closer to the to the hand-grip axis $A_H$ and the second hemisphere being further therefrom; and divided into third and fourth hemispheres by a second diametrical plane normal to the hand-grip axis $A_H$ and perpendicular to the reference plane $P_R$, with third hemisphere being closer to the to distal end 282 of the leg and the fourth hemisphere being further therefrom. In such case, the neck 310 connects to the ball-shaped proximal end 280 at the third hemisphere thereof, and in the illustrated example, more specifically at the spherical quadrant denoted by the union of the second and third hemispheres thereof; and the alignment rib 308 spans from the neck over a substantially full radius of the first hemisphere.

With reference to FIGS. 3 and 4, the two lugs 284 at the distal end of each leg 202 pivotally support a movable coupler 312 thereon for swinging movement about a pivot point 314 whose axis passes transversely through the lugs 284 in perpendicular relation to the reference plane $P_R$. The coupler is thus pivotable between a deployed position protruding beyond said distal end of the leg 202, as shown at the right leg in FIG. 3, to accommodate selective mounting of a supplemental component (e.g. a securement device 10 of the type shown in FIGS. 1 and 2) to the leg via said coupler, and a stowed position of non-protruding relation to said distal end of the elongated leg structure, as shown at the left and center legs of FIG. 3. In the illustrated embodiment, the movable coupler 312 comprises a barrel-shaped coupler body 316 having a female opening 318 at a coupling end thereof, and a pair of mounting ears 320 projecting axially from an opposing end of the body 316 for pinned connection with the lugs 284 at the distal end of the tripod leg. Each mounting ear 320 is pivotally attached to a respective one of the two lugs 284 at an outer side thereof, though a singular mounting ear between the two lugs, or a singular lug between the two ears, may alternative be employed to accomplish the pivotal connection between the movable coupler 312 and the tripod leg 202.

In the illustrated embodiment, the female opening 318 in the end of the coupler body 316 in a threaded bore for receiving threaded attachment of a component to the movable coupler 312 of the tripod leg. FIG. 13 shows a ball coupler 322 having an externally threaded stem 324 that is matable with the threaded socket 318 of the leg's movable coupler 312, and that projects axially from a ball tip 326 affixed to a distal end of the stem to remain outside the bore 318 of the movable coupler when a proximal end of the stem is threaded into the bore 318. The ball tip 326 of the ball coupler 322 can then be mated with the socket 32 of a securement device 10 or other component or accessory that requires, or benefits from, a movable ball-and-socket connection to the tripod leg to allow movement of the component or accessory relative to leg about multiple axes. Meanwhile, other components or accessories that don't require so many degrees of freedom relative to the tripod leg can be provided with threaded stems for direct attachment to the movable coupler 312 of the tripod leg 202. When a securement device 10 or other component or accessory is to be used on the tripod leg 202, the movable coupler 312 is folded out from the stowed position into a deployed position to accept attachment of the securement device 10 or other component or accessory. On the other hand, in cases where the tripod legs are being used in a self-supporting context simply seated on the ground, a tabletop, countertop, chair, shelf or any other support surface, the movable couplers 312 are left in their stowed positions, and the rounded shape of the lugs 284 at the distal ends of the legs 202 allow the lugs to seat atop the support surface regardless of the user-selected angle at which the tripods legs have been set and locked relative to the yoke.

While the example shown in FIGS. 3 and 4 shows the movable coupler 312 of each tripod leg 202 folding up against the outer side of the leg's distal segment 286 when in the stowed position, FIG. 14 shows a variant of the tripod 100' that differs from that above only in that the movable coupler 312 of each tripod leg 202' instead folds up against the inner side of the leg's distal segment. In this embodiment, when the tripod legs are collapsed together at the central axis in their selfie-stick positions, the stowed movable couplers 312 are contained internally of the collectively formed selfie stick. This variant also shows how the two lugs at the distal end 282 of the leg may be replaced with a singular lug 384 received between the mounting ears of the movable coupler 312. FIG. 14 further illustrates that the external diameter of the selfie stick collectively formed by the mated first positions of the three tripod legs may be specifically dimensioned to be of a compatible size insertable through the yoke of a second matching tripod 100' of the same construction. That is, the external diameter of the collectively defined selfie stick shaft of each tripod is of slightly lesser measured than the internal diameter of the hollow sleeve 212 of the tripod yoke 204 so that the collectively selfie stick shaft of one tripod can be slid into and through the hollow sleeve 212 of the other yoke, and locked at a selected telescopic relation thereto via the lateral clamping member 292. The two tripods 100' can both be set in their selfie-stick mode with their legs mated together in order to cooperatively form a selfie stick of greater overall length than each would have individually (FIG. 14A), or one of the two tripods 100, 100' can instead be set in its tripod mode with its legs divergent to form a tripod on which the second tripod in its self-stick mode serves as a center column standing upright from the yoke of the first tripod (FIG. 14B).

Referring again to FIGS. 7 and 8, the leg of the illustrated embodiment of molded plastic construction, and features a novel configuration of its ball-shaped proximal end 280, where instead of the outermost surface of this ball-shaped component being a continuous, uninterrupted surface in all directions around a spherical plane occupied by this surface, the outermost surface is intermittently interrupted by an array of pockets 330 that are recessed from the spherical plane distributed throughout a substantial area thereof. With reference to a central axis 332 of the ball-shaped proximal end 280 that lies diametrically of the spherical plane of its outer surface, and normally of the truncation plane 334 at the terminus of tip's truncated ball shape, the recessed pockets 330 are arrayed over the outermost surface in both a circumferential direction around the central axis 332, and an axial direction along the central axis 332. There are multiple rows of pockets 330, of which each row spans circumferentially around the central axis 332, and each pocket of each row aligns with a respective pocket in each other row in terms of it angular position around the central axis 332, thereby defining a respective column of pockets in the axial direction.

The spherically contoured outermost surface is thus divided by the pockets 330 into a plurality of axial ribs separating the columns of pockets from one another, and a plurality of circumferential ribs separating the rows of pockets from one another. This pocketed configuration of the tip's exterior has a functional benefit to the ball and socket joint formed by the ball-shaped tip 280 and the respective socket 290 of the yoke in which the ball-shaped tip 280 is received, in that should any grit (e.g. sand or other small granules) makes its way into the joint, the wear effects on the socket walls are minimized by accommodating such particulate in the recessed pockets of the ball component. There may also be benefits in the manufacture of the component, for example reduced cooling time during the plastic molding process. This same pocketing of the exterior of the ball-shaped proximal end 280 of the tripod leg can be applied to any other ball component likewise used in cooperation of a ball and socket joint.

FIGS. 15 and 16 illustrate a bi-stable securement foot 10' of the present invention, which differs from the bi-stable securement feet of FIGS. 1 and 2 in a redesign of the socket coupler 22 thereof to incorporate a novel latching mechanism cooperable a male insertion member 340 on the ball coupler 322 of FIG. 13 to form a secondary retention mechanism that supplements the frictional resistance of the snap fit relation between the socket coupler 22 and the ball coupler to better prevent inadvertent separation thereof under notable loading conditions. This way, even if loading conditions should overcome the snap-fit connection between the ball and socket couplers, complete separation thereof is still prevented by the novel secondary retention mechanism.

The socket coupler 22' has a socket tip 336 with spherically concave interior receiving socket 32 that is of greater than hemispherical size, and terminates in a circular opening at the proximal end 10a of the securement device 10' to accommodate insertion of the ball tip 326 of the mating ball coupler 322 into the receiving socket through this circular opening. A central axis 337 of the socket coupler 22' penetrates the circular opening at a center-point thereof in a direction normal to the plane of this circular opening. In a default unflexed state of the socket tip 336, the diameter of the receiving socket 32 at it circular opening thereof is slightly lesser than the outer diameter of the ball tip 236 of the mating ball coupler 322. However, on forced insertion of the ball tip 236 into the receiving socket 32, the socket tip 336 will resiliently flex into an enlarged state accommodating such insertion, before automatically returning back to its default size of lesser diameter than the ball tip 326, thereby retaining the ball tip 326 within the receiving socket 32 in a snap-fit relation therewith. This snap fit frictionally resists subsequent withdrawal of the ball tip 326 from the receiving socket 32. As shown, the socket tip 336 is preferably a split or slotted socket coupler, where the spherically contoured wall of the socket is split into multiple leaves by a set of slots 338 (e.g. two-leaves in the illustrated two-slotted example) to reduce the potential for stress failure of the socket wall over time due to repeated flexing of the receiving socket each time its mated with and detached from a cooperative ball coupler.

The male insertion member 340 has an elongated shaft element 342 protruding axially from the ball tip 326 of the ball coupler 322 at a terminus thereof situated furthest from the threaded stem 324 thereof on a central axis 341 of the coupler shared by said threaded stem. Like the ball-shaped proximal end of each tripod leg, the ball tip 326 of ball coupler in the illustrated example is truncated in planar fashion at its terminus, and the central axis lies normally to the plane of truncation. The male insertion member 340 further includes a set of spherically ball-shaped enlargements 344a, 344b, 344c, 344d of greater diameter than the shaft element 342 affixed thereto at axially and uniformly spaced positions thereon. The male insertion member thus resembles a string of pearls. At least a portion of the elongated shaft element 342 between the ball tip 326 and the first enlargement 344a nearest thereto is flexible in order to allow the relative rotation between the mated together ball tip 326 and receiving socket 32 in directions causing the central axes of the couplers 22', 322 tilt out of alignment when sufficient force is applied to overcome the frictional resistance provided between the closely conforming spherical surfaces of the couplers. This flexibility in the male insertion member 150 thus retains the angular-adjustment functionality provided by the mated ball and socket couplers.

The socket coupler 22' also features a generally cylindrical connection body 350 by which the socket tip 336 is joined to a neck 352 of the bi-stable securement foot 10', where the outer skin of the bi-stable securement foot 10' encapsulates a ribbed plug 354 of the connection body 350 at an end thereof opposite the socket tip to joint the socket coupler 22' to the rest of the bi-stable securement foot 10'. The connection body 350 features an internal female conduit 356 that intersects the receiving socket 32 to open thereinto at the otherwise closed end thereof opposite the circular opening through which the ball tip 326 of the ball coupler 322 is received. The female conduit 356 penetrates the receiving socket at the center-point of this closed end of the socket, i.e the point thereof intersected by the socket coupler's central axis. However, the orientation of the conduit is angularly offset from the socket coupler's central axis 337 by an acutely oblique angle, as shown by the relative orientations of the conduit's central axis 357 and the socket' coupler's central axis 337 in FIG. 16A. Accordingly, rather than extending axially from the socket 32 straight through the connection body 350 to the ribbed plug 354 at the far end, the female conduit 356 instead slopes obliquely outward from the socket coupler's central axis to intersect and penetrate the external periphery of the connection body at one side thereof.

From a side of the connection body 350 opposite that which is intersected by the female conduit 356, and at a location axially nearer to the socket 32, the exterior of the connection body 350 is also penetrated by an internal cavity 358 that intersects the female conduit just behind the closed end of the socket 32. In its span from the socket to the external periphery of the connection body, the female conduit 356 thus penetrates through the internal cavity 358 that intersects the conduit 356 in cross-wise relation thereto. The latching mechanism of the socket coupler 22' comprises a depressible spring latch 360 having a lever arm 362 disposed externally of the connection body 350, and a catch tab 364 reaching from said lever arm 362 into the internal cavity 358 of the connection body.

As shown specifically in FIG. 16C, the catch tab 364 has a key-slot shaped opening 366 therein, of which a wider circular portion 366A resides nearer to the lever arm 362, and a narrower notch portion 366B juts outward from the wider circular portion at the side thereof opposite the lever arm 362. The width of the wider circular 366A of the catch tab opening exceeds the diameter of the enlargements 344a-344d of the male insertion member 340 to allow passage thereof through this wider circular portion 366A, while the narrower notch portion 366B has a width smaller than the diameter of the enlargements 344a-344d to prevent such passage, but a width exceeding the diameter of the insertion members shaft element 342. The lever arm 362 is biased into a default position placing the catch tab 364 in a latching position in which the narrower notch portion 366B of the catch tab opening 366 aligns with the conduit 356 on the central axis 357 thereof, while the wider circular portion, or least a substantial fraction thereof resides outside the female conduit 356 in the part of the internal cavity spanning from the connection body exterior to the female conduit. However, the lever arm 362 is depressible out of said default position toward the connection body 350 to move the catch tab 362 into a release position in which the wider circular portion 366A of the catch tab opening 366 aligns with the conduit 356 on the central axis thereof.

Referring initially to FIG. 16A, to mate the socket coupler 22' and the ball coupler 322 together, first depression force F is applied to the lever arm 362 of the latch 360 to drive the catch tab 362 into the release position, thus aligning the wider circular portion 366A of the catch tab opening 366 inside the female conduit. Holding the latch 360 in this position, the ball tip 326 of the ball coupler 322 is inserted into the socket 32 of the socket coupler 22' through the circular open end thereof, during which the elongated shaft element 342 and enlargements 344a-344d thereon are passed through the socket-penetrating end of the female conduit 356, and further into the conduit 356 through the aligned wider portion 366A of the catch tab opening 366. This feeding of the male insertion member 340 through the conduit 356 of the connection body 350 continues until the ball-tip 326 is fully inserted into the socket 32, and captured therein by the snap-fit relationship of the ball tip and socket, whereupon the user's can release the depression force from the lever arm 362. FIG. 16B shows the fully inserted state of the ball tip and male insertion member 340, in which the enlargements 344a-344d all reside on the far side of the catch tab 364, i.e. the side thereof opposite the socket 32, whereby the release of the lever arm 362 moves the narrower notch portion 366B of the catch tab opening into embraced relation around the shaft element 342 of the male insertion member 340. This default latching position of the catch tab thus blocks the enlargements 344a-344d from being withdrawn back through the catch tab opening, thus preventing withdrawal of the ball tip 326 from the socket 32' even if the snap-fit relationship therebetween should be overcome due to mechanical failure or user-applied pulling force. Only upon subsequent re-depression of the lever arm 362 by the user to once again shift the wider portion 366A of the catch tab opening into its release position in the female conduit can such withdrawal of the male insertion member be performed to fully separate the two couplers 22', 322 from one another.

In the illustrated embodiment, the fully inserted position of the male insertion member reaches fully through the female conduit 356 so that at least the distalmost enlargement 344d furthest from the ball tip 326 resides at least partially outside the connection body 350, or if not outside the connection body, at least at a position closely adjacent to the terminal end of the female conduit that penetrates the body exterior. This way, the user can visually see this distalmost enlargement 344a, and use such visual detection thereof to confirm a full and properly latched mating of the two couplers. It will be appreciated that a lesser quantity of enlargements, even as few as one enlargement 344a, would be sufficient for the latching function to operate, and so other embodiments may have a lesser quantity of enlargements, and may optionally omit the visual confirmation function of the male insertion member, in which case the female conduit need not fully extend to the exterior periphery of the connection body. However, where such visual confirmation is included, the use of multiple enlargements is beneficial, as the distalmost enlargement 344d is easier to visually spot than the comparatively thinner shaft element 342 of the male insertion member.

FIGS. 27A through 27C illustrate a variant of the FIG. 16 embodiment that likewise uses a string-of-pearls male insertion member 340' and cooperating spring latch 360 to provide secondary retention of the snap-fit connection between cooperating ball and socket couplers. This variant differs from the preceding FIG. 16 example however, in that the spring latch 360 and female conduit 356 are provided on the ball coupler instead of on the socket coupler, and instead of being permanently attached to either of the couplers, the string of pearls insertion member 340' is a separate, removable and replaceable component. This way, should the insertion member 340' fail, it can be replaced individually, rather than having to replace an entire coupler with a permanently affixed insertion member 340. This also allows possible manufacture of substitutable insertion members 340' of different predetermined failure strength. For example, lower strength insertion members intended to be sacrificial products can be used with higher cost tripod components or accompanying equipment, where breakage of the insertion member 340' and resulting fall, damage or loss of an individual assembly component that was held by that insertion member before failure may be preferable over the a potential fall, damage or loss of the entire assembly, as might otherwise occur if the insertion member were to remain intact rather than intentionally fail at exerted loads exceeding a predetermined threshold. On the other hand, there may be other scenarios where maintaining the assembled integrity of the tripod is preferable over sacrificial decoupling of a subcomponent of the assembled tripod, and so stronger insertion members of greater failure strength are selected and used. Different graded strengths of insertion member may be visually distinguished, for example produced fully or partially in different colours than one another.

The separate insertion member 340' in the FIG. 27 variant differs from that of FIG. 16 in that the proximal end of the flexible shaft element 342, which was attached to the ball coupler 322 in the earlier FIG. 16 scenario, now instead features an oversized proximal enlargement 344Z of greater size than the other uniformly sized enlargements that are disposed serially along the shaft element 342. The shaft element 342 is also longer than that of FIG. 16, and may feature a greater quantity of these uniformly sized enlargements 344A-344I disposed serially along the shaft element 342. The increased shaft length is necessary because the overall reach of the insertion member 340' needs to be greater in the FIG. 27 variant, for reasons that will become apparent from the following description. In the FIG. 27 variant, the female conduit 356, into which the catch tab of the spring lever 360 once again extends via an intersecting cavity 358, is found in a connection body 350' of the ball coupler 322A, not the socket coupler. This connection body of the variant ball coupler of FIG. 27 is substantially the same as that described of the socket coupler in FIG. 16, except for replacement of the ribbed plug 354 with a threaded stem 324. This first female conduit 356 thus occupies a position that opens into an otherwise closed end of a hollow interior of the ball tip 326 at a center-point of this closed end, and that angles obliquely outward from the ball coupler's central longitudinal axis to insect and penetrate the external periphery of the ball coupler's connection body 350' at one side thereof, just like the female conduit 356 in the socket coupler of FIG. 16.

The variant of FIG. 27 includes a latch-free second female conduit 356' in the other coupler, i.e. in the socket coupler 22A. This latch-free second female conduit 356' is similarly positioned to the latch-equipped female conduit 356 of FIG. 16, thus penetrating the receiving socket 32 at the center-point of its closed end, and then sloping obliquely outward, optionally on a curved path, from the socket coupler's central axis to intersect and penetrate the external periphery of the socket coupler's connection body 350 at one side thereof. The terminal end of the latch-free second female conduit 356' that penetrates the exterior side of the socket coupler's connection body 350 features a recess 368 of spherically concave curvature in the exterior of the connection body 350. A diameter of this recess 368 exceeds a width or diameter of the rest of the latch-free second female conduit 356'. The recess 368 is dimensioned for conforming fit with the spherical exterior of the oversized proximal enlargement 344Z of the separate insertion member 340', while the lesser width/diameter of the remainder of the latch-free second female conduit 356' is less than the diameter of the oversized proximal enlargement 344Z. Entry of the oversized proximal enlargement 344Z into the remainder of the latch-free second female conduit 356' is thus presented, while the width/diameter of the remainder of the latch-free second female conduit 356' is remains large enough to accommodate insertion therein, and passage therethrough, of the smaller uniform enlargements 344A-344I.

To mate the socket coupler 22A and ball coupler 322A of FIG. 27 together, first the separate insertion member 340' is inserted, distalmost enlargement 344I first, into the latch-free second female conduit 356' of the socket coupler 22A through the concave recess 368 at the side of the connection body 350. The insertion member 340' is inserted onwardly through the latch-free second female conduit 356' until the oversized proximal enlargement 344Z becomes seated into the concave recess 368, as shown in FIG. 27B. The separate insertion member 340' is now situated in a working position in which a distal portion of the shaft element 342 protrudes axially from the socket 32 of the socket coupler 22A at the open end thereof, with at least a subset of the uniform enlargements 344E-344I thus being carried outside the socket 32 by this protruding distal portion of the shaft element 342. With a thumb or finger of one hand, a user holds the oversized proximal enlargement 344Z in place in the concave recess 368 to maintain this working position of the separate insertion member 340', while a thumb or finger of the user's other hand is used to depress the lever arm 362 of the latch 360 on the ball coupler 322A to drive the catch tab 362 into the release position.

While holding the insertion member 340' and the spring latch 360 in these positions, the user inserts the ball tip 326 of the ball coupler 322A into the socket 32 of the socket coupler 22A, during which the distal portion of the elongated shaft element 342 and the distal subset of enlargements 344E-344I thereon are inserted into the latch-equipped first female conduit 356, and passed further onward through this conduit 356 via the aligned wider portion 366A of the catch tab opening 366. This feeding of the distal portion of the separate insertion member 340' through the latch-equipped first conduit 356 of the connection body 350' of the ball coupler 322A continues until the ball-tip 326 is fully inserted into the socket 32, and captured therein by the snap-fit relationship of the ball tip and socket. Here, the user can release the depression force from the lever arm 362 of the spring latch 360, and release the oversized proximal enlargement 344Z of the separate insertion member 340'. As before, the distalmost enlargement 344I is visible at the exterior of the ball coupler's connection body 350' to confirm the fully inserted and latched status of the separate insertion member 340. The default latching position of the catch tab 364 prevents withdrawal of enlargements 344F-344I back through the catch tab opening, thus preventing pulling of the separate insertion member 340' back out of the ball coupler 322A, while the oversized proximal enlargement 344Z blocks pulling of the insertion member blocks out of the socket coupler 22A.

While the illustrated example in FIG. 27 has the latch-equipped conduit 356 in the ball coupler 322 and the latch-free conduit 356' and cooperating recess 368 in the socket coupler, it will be appreciated that this arrangement may alternatively be reversed, and that the latch-equipped ball coupler 322A of FIG. 27 may be used with a socket coupler having a permanently attached string-of-pearls insertion member 340, like that shown on the ball coupler 322 of FIG. 16.

FIG. 17 illustrates how the same type of string-of-pearls male insertion member 340 may be included at the ball-shaped proximal end 280 of each tripod leg 202 of the tripod of FIGS. 3 to 6 for similar use in a secondary retention mechanism for preventing inadvertent separation of the tripod leg from the respective socket of the yoke 204, even if the clamping action on the ball-shaped proximal ends 280 of the legs should fail. For cooperation with the male insertion male insertion member 340 protruding form the terminus of the leg's ball-shaped proximal end, the yoke body 206 features a set of three female retention bores 370 that penetrates downwardly through the topside of the yoke body at the annular seating area 224 thereof, each from a position overlying a respective one of the three spherically concave pockets 220 at the underside of the yoke body at an innermost region of the respective pocket 220 nearest to the boundary wall of the yoke body's central opening 226. Each female retention bore 370 thus penetrates fully through the yoke body into a respective one of the yoke's three sockets 290.

During assembly of the tripod, when the ball-shaped proximal end 280 of each leg 202 is inserted into the respective socket 290 before tightening the lower clamp 210 via the rotatable upper collar 208, the male insertion member 340 of the leg 202 is fed upwardly through the respective female retention bore 370. The length by which the male insertion member's flexible shaft element 342 protrudes from the terminus of the leg's ball-shaped proximal end 280 exceeds the length of the female retention bore so that the flexible shaft element 342 reaches fully through the female retention bore 370 when the ball-shaped proximal end 280 of the leg 202 is fully received in the respective socket of the yoke. The axial locations thereon of the enlargements 344a-344d on the flexible shaft element are such that at least the distalmost enlargement 344d will reside outside the female retention bore 370 at the topside of the yoke body in this fully inserted state of the leg's ball-shaped proximal end 280 and attached male insertion member 340.

The annular wall 222 surrounding the seating area 224 has a respective gap 372 therein where each of the female retention bores penetrates the seating area 224, so that a distal portion of the flexible shaft element 342 reaching out from the female retention conduit can be routed outwardly through this gap, thus placing the distal end of flexible shaft element 342 and at least the distalmost enlargement 344d radially outside the annular wall 222 at a position that won't interference with advancement of the rotatable upper collar 208 down against the seating area 224 once the ball-shaped proximal ends 280 and attached male insertion members 340 of all three tripod legs have been fully inserted. FIG. 17 shows the result of such leg insertion and collar tightening steps, where one or more exposed enlargements (particularly enlargements 344b-344d in the illustrated scenario) reside outside both the female retention bore and the annular wall 222, and the abutted or closely adjacent relationship between the bottom of the advanced upper collar 208 and the seating area 224 of the yoke body 206 substantially closes off the top end of each female retention bore 370, leaving open only a partial fraction of the retention bore's upper end that resides in the respective gap 372 of the annular wall. This open partial fraction of the retention bore's upper end is large enough to accommodate the flexible shaft element 342 of the male insertion member 340, but not any of the enlargements 344a-344d thereon. Accordingly, the advanced or tightened upper collar 208 blocks retraction of the one or more exposed enlargements 344b-344d back through the retention bore 370 to the respective socket, thereby preventing pulling of the male insertion member from the retention bore 370 and thus tethering the attached tripod leg to the yoke. Therefore, even if the lower clamp 210 were to fail in a manner incapable of holding one of more of the legs' proximal ball-shaped ends, the legs would continue to retain a tethered secondary connection to the yoke body via the male insertion members 340 that are effectively secured to the yoke body by the rotatable upper collar 208 blocking their extraction.

While the illustrated example in FIG. 17 shows the male insertion member 340 emanating from a hollow internal socket of the ball-shaped proximal end 280 of the leg 202, and with a proximal end of the male insertion member being attached to the leg in a fixed non-adjustable manner at a fixed location thereon, other embodiments may have the male insertion member attached at other locations on the leg, and/or incorporate a means of adjustable connection of a proximal portion of the male insertion member to the leg to enable adjustment of an effective tethering length by which the distal end of the male insertion member can reach from the leg. In the case of such adjustability, the tethering action of the leg to the yoke could be selectively tensioned by the user once the legs have been set to a user-desired position of use relative to the yoke, and clamped in such position by tightening of the lower clamp 310 via the rotatable upper collar 308. In such embodiments, the overall effective holding strength by which the legs are constrained in their user selected positions is increased by the combined clamping force of the lower clamp, and tension force of the user-tightened, adjustable-length male insertion member.

FIGS. 18A through 18C illustrate a magnetic basal 380 that can optionally be connected to the distal end of each tripod leg 202 in place of one of the bi-stable securement feet 10, 10'. The basal 380 features a body 382 having a proximal end 382A with socketed configuration for connection to the tripod leg 202 via the intermediary ball coupler 322 of FIG. 13, and an axially opposing distal end 382B for placement on a surface on which the tripod leg is to be magnetically supported. Accordingly, a magnet 384 is mounted to the body 382 at the distal end 382B therefore, particularly in a recessed fashion residing flush with a remainder of the distal end in the illustrated example, though in other embodiments the magnet may be surface mounted to the distal end, or embedded within the body (e.g. via inset molding) to reside internally thereof in closely adjacent relation to the distal end with a thin coating of the body's constituent material overlying the pole face of the magnet. In any case, the pole face of the magnet faces axially outward from the distal end of the body to emit a magnetic field axially therefrom, so that when the distal end is placed against a ferromagnetic surface, the distal end is magnetically held to said ferromagnetic surface. As viewed in an axial direction denoted by longitudinal axis 386 along which the proximal and distal ends are spaced, the distal end 382B of the body 382 has a lobed shape, whose outer perimeter comprises a lobed region 388 of greater radial protrusion from an outer circumference of the magnet 384 on one perimeter side thereof than on its other remaining perimeter sides.

In use of the tripod with one or more magnetic basals on one or more of the tripod legs, this lobed region of each basal supplements the magnetic attraction thereof to resist tilting of the respective tripod leg relative to the ferromagnetic surface to which it magnetically held, and thus helps keep the magnetically equipped distal end of the basal in contact with the surface. Particularly in the instance where three magnetic basals are used together on the three legs of the tripod, the lobed regions of the three basals are preferably pointed inwardly toward the central axis of the tripod, whereby for any tilt-inducing load tending to tilt the tripod in a radial direction corresponding to one of the three legs, the lobed regions of the two other legs will both resist such tilting, whereas if the lobed regions were pointed outward, tilt resistance would only be provided by the one leg that most closely matches the tilt direction.

The basal body 382 is of a multi-piece construction, of which at least two different pieces are composed of different respective constituent materials imparting distinct material properties to said two different pieces. In the illustrated example, the multi-piece body 382 is composed of three different pieces: a proximal piece 390 defining the proximal end 382A, a distal piece 392 defining the distal end 382B, and a linking piece 394 joining together said proximal and distal pieces together. The linking piece 394 is composed of a resiliently flexible constituent material (e.g. latex or silicone) of greater flexibility than the respective constituent material (e.g. rigid plastic) of each said distal base and said proximal coupler. In the illustrated example, the proximal piece 390 is of similar construction to the socket coupler 22' of FIGS. 16A-16C, thus having a socket tip 336 for mating receipt of the ball tip 326 of ball coupler 322, and a female conduit 356 and depressible spring latch 360 for latched receipt of the male insertion member 340 of said ball coupler 322. Instead of the ribbed plug 354 shown in FIGS. 16A & 16B, the proximal piece 390 in FIGS. 18B & 18C features a cross-bored or cross-slotted anchor 396 at the end of the piece opposite the socket tip 336. This serves the same purpose of encapsulated anchoring of the proximal piece 390 within the constituent material of the linking piece 394. As shown in FIG. 18B, crosswise bores or slots in this anchor 396A serve as voids 398 in the proximal piece that are filled with the constituent material of the linking piece during molded production of the linking piece, thereby attaching the proximal and linking pieces together without use of separate fasteners.

At the end of the linking piece 194 opposite the proximal piece 190, the distal piece 192 is likewise attached through encapsulated anchoring of a cross-bored or cross-slotted anchor 396B of the distal piece 192, shown in FIG. 18C to have at least one crosswise bore or slot forming a similar void 398B filled with the constituent material of the linking body, thereby again serving to attach the two pieces without use of separate fasteners. The resiliently flexible linking body 394, on top of the multi-axis angular adjustability of the ball and socket connection between the magnetic basal and the tripod leg, and the single-axis angular adjustability of the optional movable coupler 312 of the tripod leg, adds an additional degree of directional variability between the tripod leg and the magnetic distal end 392B of the basal 380, and also provides a degree vibrational absorption/dampening.

FIGS. 19 and 20 illustrates two telescopically mated sections of a telescopically adjustable tube assembly 400 usable to form all or part of a telescopically adjustable tripod leg, like those of FIG. 1. The illustrated assembly 400 features an outer tubular member 402, and an inner tubular member 404 telescopically received in said outer tubular member for selective longitudinal displacement relative thereto on a longitudinal axis 406 shared by said tubular members to adjust an amount of telescopic extension of said inner tubular member from said outer tubular member. The assembly further includes a novel locking mechanism 408 that is selectively operable to lock said inner tubular member at a selected degree of telescopic extension from said outer tubular member. The locking mechanism 408 features an end fitting 410 mounted on the upper end of the outer tubular member through which the inner tubular member is received, and a squeeze lever 412 pivotally supported on the outer tubular member by the end fitting 410.

The end fitting 410 is a generally cylindrical collar 414 that fits circumferentially around the exterior of the outer tubular member 402. At least one stop flange 416 juts radially inwardly from a circumferential wall of the collar 414 at the top end thereof to overly the annular top end of the outer tubular member 402, thus blocking downward axial displacement of the end fitting 410. To prevent upward axial displacement, and thereby cooperate the stop flange 416 to hold the end fitting in place and prevent sliding thereof from off the top end of the outer tubular member, the collar 414 also has one or more resiliently flexible stop tabs 418 integrated into the circumferential wall of the collar near the bottom end thereof, just like the top tabs 246 of the earlier described yoke sleeve 212, but with the protruding tip of the stop tab 418 formed on the inner side thereof that faces the inner and outer tubular members 404, 402. The protruding tip of each such stop tab 418 protrudes into a small catch opening 420 in the outer tube to block the upward displacement of the end fitting. A pair of stop ribs 422 jut radially outward from, and run axially along, the exterior of the collar 414 at diametrically opposing points thereon for the purpose of limiting pivotal movement of the squeeze lever 412 and defining a fully depressed state thereof defining the locking position of the locking mechanism.

Situated respectively close to the two stop ribs 422, on same half of the collar circumference as one another, are a pair of pivot stubs 424 jutting laterally outward from the exterior of the collar's circumferential wall at the two opposing sides thereof from which the stop ribs also laterally protrude. Each of these pivot stubs 424 is engaged in a respective pivot hole in the squeeze lever 412, whereby the two pivot stubs pivotally support the squeeze lever on the outer tubular member 402 in a manner pivotable about a pivot axis that lies perpendicularly transverse to the longitudinal axis 406 of the tubular members 402, 404. Also situated respectively near the stop ribs 422, and just below the pivot stubs 424, the end fitting additionally features a pair of engagement openings 426 that open through the circumferential wall of the collar at positions overlying a respective pair of engagement windows 420 that likewise open through the circumferential wall of the outer tubular member 402. The end fitting also features an additional push opening 430 that opens through the collar wall on the same circumferential half thereof as the two engagement openings 426. In the circumferential direction of the collar 414, the push opening 430 resides between the two engagement openings. Considering the "height" of each opening to be that measured in axial direction denoted by longitudinal axis 406, the push opening 430 has notably smaller height than the taller engagement openings 426, whereby the push opening has a more slot-like shape.

The squeeze lever 412 hangs downwardly from the two pivot stubs 424, more particularly in a divergent fashion angling downwardly and radially outward from the end-fitting and tubular members when in the release position shown in FIG. 19, and in a conforming fashion lying generally parallel and flush to the end fitting when in the locking position of FIG. 20. The exterior side of the squeeze lever facing outwardly away from the end fitting and the tubular members is convexly and arcuately curved in the circumferential direction around the end fitting and tubular members, with a majority surface area of the opposing interior side of the squeeze lever being concavely and arcuately curved in this same direction so as to conform against the convex exterior of the end fittings collar wall when the squeeze lever is in the locking position. Exceptions to this concavely curved character of the squeeze lever's interior side include two tangentially oriented engagement tabs 432 each projecting inwardly from the interior side of the squeeze in a respective tangential plane that lies tangentially of the inner tubular member 404 and cuts through a respective one of the engagement openings 426 and the respective engagement window 428. The engagement tabs 432 are long enough to reach beyond the pivot holes in which the pivot stubs 424 are received, and are spaced from radially from the pivot axis by the same radial distance as the engagement openings and window from the same pivot axis.

Accordingly, to lock the tubular members 402, 404 at a selected degree of telescopic extension, a user can grip the outer tubular member 402 in the first of one hand just below the end fitting, and with the thumb of the same hand (or optionally with the thumb of the other hand), pushes on the exterior side of the squeeze lever to force the squeeze lever inwardly about its pivot axis toward the end fitting and the telescopically mated tubes. During this movement toward the locking position, also referred to as a "closing" stroke of the locking mechanism, the engagement tabs 432 are driven through the engagement openings and engagement windows of the end fitting and the outer tube, and into the annular space between the tubular members 402, 404 on opposing sides of the inner tubular member 404, thereby frictionally wedging the two engagement tabs 432 tangentially between the two tubular members, and thus providing a frictional locking action preventing telescopic movement therebetween.

A push rib 434 also protrudes inwardly from the otherwise concavely curved interior side of the squeeze lever at a position located between the two engagement tabs 432 in the circumferential direction, but at a lower elevation further from the pivot axis than the two engagement tabs 432. More specifically, the push rib 434 is located at the same radial distance from the pivot axis as the push opening 430 in the end fitting, and protrudes a lesser distance from the squeeze lever's interior side than the engagement tabs 432. Accordingly, only during the last part of the closing stroke, the push rib 434 is driven through the push opening in the end fitting and thereby applies a radial pushing force against the outer tubular member 402.

To make it easier to perform the "opening stroke" of the locking mechanism back to its release position extracting the engagement tabs 432 and push rib 434 back out through the engagement and push openings, the illustrated example of the squeeze lever has a flared lower region 436 that angles further outwardly from the rest of the squeeze lever. As shown in FIG. 20B, in the closed or locking position of the squeeze tab, this creates a fingertip pocket 438 between this flared out lower region 436 and the circumferential collar wall of the end fitting, into which the user can insert a fingertip to pry the squeeze lever out of its locking position with sufficient force to overcome the frictional resistance to the extraction of the engagement tabs 432 from their wedged positions between the inner and outer tubular members 404, 402.

In the illustrated embodiment, the inner and outer tubular members are longitudinally ribbed, whereby each tubular member 404 has a pair of diametrically opposite slots 440 recessed into its exterior, and a pair of corresponding diametrically opposite ribs 442 protruding into its interior. To aid the stop tabs 418 in resisting rotational movement of the end fitting around the outer tubular member, the end fitting may comprise anti-rotation nubs 44 that jut inwardly therefrom into the exterior slots 440 of the outer tubular member 402. One such anti-rotation nub 444 engaged in one of the outer tube's two exterior slots can be seen at the top of the end fitting on the one of the stop flanges 416 that resides at the lever-equipped half of the end fitting, and another such nub 444 engaged in the other of the outer tube's exterior slots can be seen at the bottom of the end fitting 410 in the cross-sectional views of FIGS. 19B and 20B.

FIG. 21 illustrates a novel ring attachment 450 of the present invention usable on any tubular member of a telescopically length-adjustable tripod leg, or on the singular tubular member of a non-telescopic fixed-length tripod leg. The ring attachment 450 features a ring-shaped base 452 ("ring base" for short) having a central opening of equal to or slightly greater diameter than the exterior of the tubular member 454 of the tripod leg so that the tubular member 452 extends axially through the central opening to situate the ring base 452 in circumferential relation around the exterior of the tubular member 454. A plurality of ball couplers 322' have respective stems 324' attached to the ring base 454 at circumferentially spaced positions around the exterior thereof. Each stem 324' projects radially outward from the ring base 452, and carries a respective ball-tip 326' at an outermost distal end of the stem 324' furthest from the ring bae 452. In the illustrated, each ball-tip 326 has the aforementioned externally pocketed configuration like the ball-shaped proximal ends of the tripod leg embodiment of FIGS. 3, 4, 7 and 8, but lacks the male string-of-pearl insertion member 340 described in the earlier embodiments, though each ball-tip 326' may alternatively have a non-pocketed spherical surface and/or a respective string-of-pearls insertion member. In the illustrated example, the stem 324 is a permanently affixed feature of the ring base 452, being a seamlessly integral part of the ring base's plastic molded construction, though other fabrication methods, materials and/or attachment types may be employed. Though the illustrated example of the integrally attached stem 324 is cruciform in shape, this also need not be the case.

Attached to and projecting axially from the ring base in one direction along the tubular member 454 is a collet sleeve 456 having, in sequential order moving away from the ring base, a threaded coupling region 458 equipped with external threading, and a gripping region 460 with axial slots 462 splitting this region of the sleeve into multiple leaves 464 around the circumference of the tubular member 454, which passes axially through an open central bore of the sleeve 456. A tightenable lock collar 466 cooperates with the collet sleeve 456 to form a twist lock by which the split leaves of the sleeve's tripping region are forceable into radially tightened relation against the exterior of the tubular member to both axially and rotationally lock the sleeve relative to the tubular member in a frictional manner. For purpose, the lock collar has an internally threaded coupling section 468 that mates with externally threaded coupling region 458 of the sleeve, and an internally tapered section 470 that is situated across the coupling section from the ring base 452 and tapers in diameter in the axial direction away from the ring base.

In the illustrated example, the collet sleeve is a separate component from the ring base 452, and more particularly is a plastic molded component designed for snap-fit coupling the ring-based. This can be seen in FIG. 21C where a mounting section 472 of the collet sleeve is received in the central opening of the ring base 452, and features resiliently flexible catch tabs 474 that are integrally formed in the circumferential wall at the bottom end of the collet sleeve. These catch tabs 474 have out-turned catch tangs 474A at their lowermost free ends, which that catch under an internal lip 476 on the inner wall of the ring base 452. A stop flange 478 higher up on the exterior of the collet sleeve's mounting section protrudes outwardly over the annular top end of the ring base's inner wall to cooperate with the latched catch tabs 474 to axially lock the base ring 452 and the collet sleeve together. The base ring and collet sleeve are also rotationally locked together, for example through mating of a protruding male rib on the exterior of the collet sleeve with a matching female slot on the interior of the ring base's inner wall, or vice versa Advancement of the lock collar 466 toward the ring base on the threaded coupling section of the collet sleeve advances the internally tapered section of the lock collar over the split leaves of the collet sleeve's gripping region to force said leaves radially inward against the tubular member 454 to perform the locking action thereon. Backing off the threaded connection between the lock collar and the collet sleeve releases the locking action to allow axial sliding of the collet sleeve and attached ring base along the tubular member, and/or rotation of the collet sleeve and attached ring base around the tubular member. Accordingly, the set of ball couplers 322' on the ring base can be adjusted in position on the tubular member of the tripod leg both in the axial direction therealong, and the circumferential direction therearound. Accordingly, socket-equipped components or accessories whose sockets are connectable to the ball-tips 326' of the ball couplers 322' can be attached to the tripod leg at any number of different of axial and circumferential locations thereon, thus providing notably improved flexibility over the FIG. 1 example in which threaded-stem ball couplers 322 of the type shown in FIG. 13 can only be installed at specific predefined locations on the tripod leg denoted by the threaded ports 122a, 122b therein.

FIGS. 22 through 24 illustrate an accessory mounting system usable instead of, or in addition to, the ring attachment of FIG. 21 to attach a separate accessory to a tripod.

The illustrated example is a two-part system, the two parts of which are embodied in an accessory mount 480 on the accessory is to be carried, and a separate leg attachment 482 removably attachable to the tripod leg, and configured for selective coupling of the accessory mount 480 to the leg attachment. The accessory may be of any variety, including an backup battery pack, a charger, a lighting device for illuminating a scene to be captured by a camera installed on the tripod, a floatation device for floating support of the tripod in a body of water, or any other useful accessory relevant to tripod or camera functionality. The accessory mount 480 may be integrated into the accessory itself, or may alternatively be equipped with suitable coupling features thereon by which the accessory may be selectively attached. As outlined below, the accessory mount 480 and co-operable leg attachment 482 are configured for a quick and convenient, tool-free "rock and dock" coupling of the accessory to the leg attachment.

With reference to FIG. 22, the accessory mount 480 features an elongated bar-like main body 484 having a top end 484A and an opposing bottom end 484B separated in an axial direction that when the accessory mount and leg attachment are both installed on a tubular section of a tripod leg will run parallel to the longitudinal axis of the tripod leg. At the bottom end 484B, a small male mating tab 486 protrudes axially from the main body by a short distance. Adjacent the opposing top end 484A, a male coupling clip 488 on the main body 484 has a pair of resiliently flexible jaw tabs 488A projecting from an inner side thereof that faces the leg attachment 482 when the accessory mount 480 is coupled thereto.

The leg attachment 482B also features respective main body 490 of elongated character between its axially opposing top and bottom ends 490A, 490B, but instead of relatively flat bar-like shape, is trough-shaped so as to have a concavely shaped inner side 490C for conforming placement against the outer circumference of the tripod leg. At its top and bottom ends 490A, 490B, respective upper and lower attachment portions 492A, 492B of the trough-shaped main body 490 each have an angular span of at least, or slightly more than, 180-degrees around a central axis of the inner side's concave curvature in cross-sectional planes normal to said central axis, which coincides with the longitudinal axis of the tripod leg when the leg attachment 490 is installed thereon. A narrower intermediate portion 492C of the trough-shaped main body 490 that spans axially between the two attachment portions 492A, 492B is narrower than said two attachment portions, thus spanning a less angular distance around the central axis in said cross-sectional planes.

At the upper attachment portion 492A adjacent the top end 490A of the trough-shaped main body 490, a rigid catch lug 494 protrudes from the outer side thereof for mated latching thereof between the flexible jaw tabs 488A of the coupling clip 488 of the accessory mount 480. For such purpose, the catch lug 494 has respective female openings at its opposing sides 494A to receive respective tangs of the jaw tabs 488A of the coupling clip 488. At the lower attachment portion 492B adjacent the bottom end 490B of the trough-shaped main body 490, a receiving lug 496 also protrudes from the outer side thereof and defines a female mating slot 496A that opens into the topside thereof and is suitably sized and shaped to accommodate insertion of the male mating tab 486 of the accessory mount 480. The narrower intermediate portion 492C of the trough-shaped main body 490 has a flattened central strip 498 spanning the full axial length thereof for flush placement of the bar-like 484 main body of the accessory mount 480 thereagainst when the two parts are coupled together, and its from these otherwise flattened central strip 198 from which the catch lug 494 and receiving lug 496 protrude.

Turning to FIG. 23, to couple the accessory mount 480 to the leg attachment 482, first, with the accessory mount 480 held in a tilted orientation relative to the leg attachment 182 at an acutely oblique angle thereto with the male mating tab 486 of the accessory mount 480 above the receiving lug 496 of the leg attachment 482, the tilted accessory mount 480 is displaced axially downward along the leg attachment 482 in order to insert the male mating tab 486 into the female mating slot 496A of the receiving lug 496, as shown in FIG. 23A. Then, as shown in FIG. 34B, the top end 484A of the accessory mount 480 is tilted toward the leg attachment 482 (and thus toward the tubular member of the tripod leg on which the leg attachment is mounted, as described further below). Such tilting action takes place about a pivot point or fulcrum defined by the mated condition between the male mating tab 486 and the female slot 496A of the receiving lug 496. This tilting action causes the coupling clip 488 to latch onto the rigid coupling lug 495 in snap fit fashion, thus coupling the accessory mount to the leg attachment. This is also referred to as a "rock and dock" coupling action, since the accessory mount is tilted or "rocked" about the pivot point to in order to secure or "dock" the accessory mount to the leg attachment via latched coupling.

It will be appreciated that while in the illustrated example it is the accessory mount 480 that has a male mating feature (mating tab 486) for insertion into a female mating element (receiving lug 496) on the leg attachment 182, this arrangement of mating componentry may be reversed, with the male mating component being defined on the leg attachment and the female mating component defined on the accessory mount. Likewise, while the coupling componentry is embodied in a rigid catch lug 494 on the leg attachment 482 and a resiliently flexible coupling clip 488 on the accessory mount 480, this arrangement of coupling componentry may be reversed. Also, the terms "top", "bottom", "upper" and "lower" are used in relation to the illustrated orientation, and is not intended to limit the specific orientation of use, as the leg attachment may alternatively be installed on the tripod leg in upside down relation to the illustrated orientation.

Two of the leg attachments 482 are shown attached to a tubular member 454 of a tripod leg in FIG. 24, where it can be seen that the tubular member is of the ribbed configuration described earlier in relation to FIGS. 19 and 20, and thus has a pair of axially running slots 440 recessed in its exterior at diametrically opposing points thereon. For mating with these slots 440, the leg attachment 482 features, at each of its upper and lower attachment portions 492A, 4926, a pair of axially oriented ribs 500 thereon at positions spaced 180-degrees apart on the arcuate curvature of attachment member's concave inner side. The distance between the two ribs 500 is slightly less than the diameter of the tubular member's exterior at non-recessed areas thereof. Accordingly, pushing of the concave inner side of the leg attachment 482 against a side of the tubular member 454 of the tripod leg will case the two rib-equipped opposing sides of each attachment portion 492A, 494B to resiliently flex away from one momentarily, until the ribs 500 reach the diametrically opposing slots 440 of the tubular member, whereupon the sides of each attachment portion will resiliently snap back into their normal positions, thus engaging the ribs 500 into the slots 440, and thereby securing the leg attachment to the tripod leg. As shown in FIG. 24, the narrower width of each leg attachment 482 at the intermediate portion 492C thereof leaves the two slots 440 of the tubular member 454 uncovered over the length of this intermediate portion 492C, whereby one of the attachment portions of a second leg attachment 482' installed at a second opposing side of the tubular member 454 can reside at a same elevation thereon as this intermediate portion 492C of the first leg attachment 482 on the first side of the tubular member. Multiple leg attachments can thus be installed on the same tubular member 454 as one another at axially overlapping positions thereon.

FIG. 24 also illustrates use of a string-of-pearls style tether 502 to further secure one of the leg attachments to the tubular member 454 by preventing inadvertent popping of the ribs 500 of the leg attachment out of the mating slot 440 of the tubular member 454. The tether 502 is composed of a flexible strand having a series of spherical ball-shaped enlargements 504 thereon, thus resembling a string of pearls. At least one of the attachment portions of the leg attachment (in the illustrated example, the same attachment portion 492B at which the receiving lug 496 resides), has a pair of catch ears 506 protruding externally therefrom at opposing sides thereof in generally diametric opposition to one another relative to the leg attachment's central axis, each thus residing at generally matching position around said axis as the respective rib 500 on that side of the attachment portion. Each catch ear 506 has a slot 508 therein that penetrates through the ear in a generally tangential direction relative to the central axis. The slot is open at one side thereof, and is wide enough to accept the strand of the tether 502, but not any of the enlargements thereof. In FIGS. 22 and 23, the catch ears are of a style where the slot of each ear is open at a radially-facing side of the ear furthest from the central axis, while in FIG. 24 the catch ears are of slightly different style where the slot is open at an axial-facing side of the ear facing toward the other attachment portion of the leg attachment. Each catch ear also has a spherically concave pocket 510 in a circumferentially facing side thereof that faces circumferentially toward the central strip 198 at which the catch lug 494 and receiving lug reside.

To secure the tether in a working position operable to hold the leg attachment on the tripod leg, a portion of the strand that neighbours a first enlargement of the tether at or near one end of the strand is fed into the slot of one of the catch ears through the open side of the slot so that the terminal enlargement resides on the pocketed side of the catch ear, and the remainder of the strand on the opposing side of the ear is pulled taught and wrapped around the uncovered side of the tubular members 454 opposite the leg attachment toward the opposing catch ear 506, as shown with arrows in FIG. 24. With the stretched taught across the uncovered side of the tubular member to span thereacross to the opposing catch ear, another portion of the strand is fed into the slot of that second catch ear through the open side of the slot, thus placing a respective second enlargement that neighbours this portion of the strand in the spherically concave pocket of that second ear. The tension of the strand holds the two pocket-held enlargements of the tether firmly against the two catch ears in the respective spherical pockets 510 thereof, thus securing the tether in place with the portions of the strands neighbouring those pocket-held enlargements thus captured in the slots of the two catch ears.

The secured together and the leg attachment now collectively span fully around the tubular member 454, with the tether applying a tension force between the two catch ears at the opposing sides of the tubular member to prevent the opposing sides of the leg attachment from flexing away from one another, and separating from the slotted sides of the tubular member. It will be appreciated that while the illustrated embodiment uses two matching catch ears of the same type to respectively and removably engage the tether at or adjacent opposing ends thereof, one end of the tether may alternatively be permanently attached to a respective side of the leg attachment, with only the other side using the described removable capture of the string-of-pearls tether to secure it in the working position spanning across the uncovered side of the tubular member 454, in which the tether cooperates with the secured leg attachment to fully encircle the circumferential entirety of the tubular member.

By providing a mounting arrangement (coupling and receiving lugs 494, 496) on a leg attachment that can be selectively installed on and removed from the tripod, and that can also be axially adjusted in position along the tripod leg by sliding of the ribs 500 in the slots 440 before using the tether to tension in the leg attachment in place on the tubular member, the two-part accessory mounting system of the illustrated embodiment provides the most flexibility, giving the user-selectable positioning of the accessory on the leg when the leg attachment is installed, while allowing full telescopic collapse in the context of a telescopically adjustable tripod leg when the leg attachment is removed. However, instead of placing the coupling and receiving lugs 494, 496 or other coupling and mating componentry on a removable attachment, such componentry may alternatively be permanently attached or integrated into the tubular component itself in other embodiments. Also, the same benefits of the "rock and dock" mounting system may be employed in any context where such mounting of a component or accessory on an elongated shaft would be useful, regardless of whether such shaft is particularly a tubular member of a tripod leg. This is also true of the earlier embodiment that instead employs an axially and rotationally adjustable ring attachment. Accordingly, the componentry, structures and methodologies described in relation to these embodiments may be employed in any variety of support system employing one or more elongated shafts in a structure intended to support other objects, and are not limited specifically to three-legged "tripod" support systems for cameras and the like.

Figure 26:
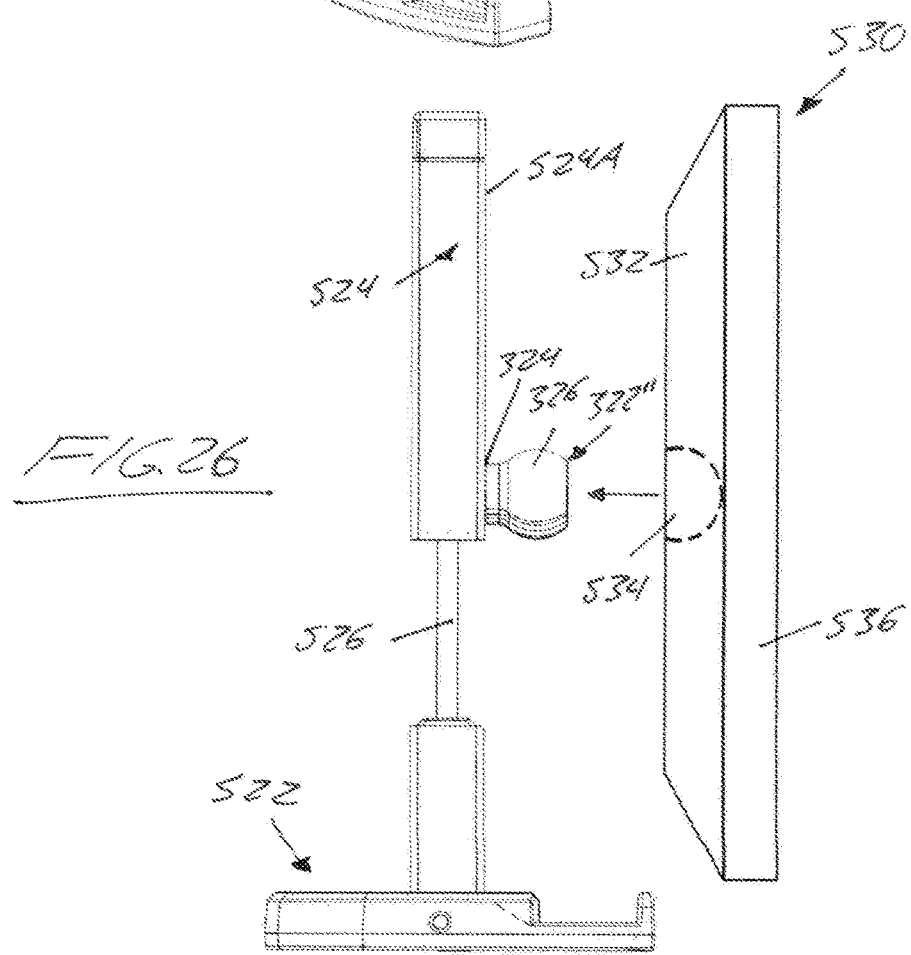
FIG. 26 is a side elevational view of the smartphone/tablet holder of FIG. 25, illustrating cooperative use thereof with a socket-equipped smartphone/tablet case.

FIGS. 25 and 26 illustrate an inventive holder 520 for smartphone or tablet computer. The holder 520 features a base 522 for placement atop a table, desk, shelf or other flat support surface, and a movable support 524 residing above the base and supported thereon in an elevationally adjustable manner movable upwardly away from and downwardly toward said base in a height direction. Movement of the support 524 relative the base is constrained to linear movement in this height direction via a pair of stationary guide rods 526 that stand upright from the base and are received in two respective bores that penetrate upwardly into the support 524 from the bottom end thereof, whereby the support is movable upwardly and downwardly on the guide rods 526. A suitable locking mechanism (not shown) is employed for user-actuated or self-actuated locking of the support at any user selected height on the guide rods.

A front side 524A of the holder features a plurality of threaded mounting holes 528 opening thereinto at different elevations thereon to serve as predefined mounting points at which a ball coupler 322" is selectively attachable to the movable support 524. The ball coupler 322" is similar to that of FIG. 13, except lacking the male insertion member 340 thereof, and thus has an externally threaded stem 324 that carries a ball-tip 326 at distal end thereof. The internal threading of the holes 528 in the movable support 524 is compatible with the external threading of the ball coupler stem 324 to enable selective threaded attachment of the ball coupler 322" to the movable support 524 at any of the elevationally distinct holes 528 therein. In the illustrated example, there are three such holes 528 in the movable support, but the quantity of holes may be varied in either increased or decreased quantity from the illustrated example.

FIG. 26 illustrated use of the holder 520 in combination with a protective smartphone or tablet case 530 that, in a conventional manner, fits externally around the perimeter of a smartphone/tablet and spans fully over the backside thereof to impart fall protection to the smartphone or tablet computer. The novel case 530 differs from a conventional one in that the rear wall 532 of the case 530 that overlies the backside of the smartphone/tablet incorporates a spherically concave socket 534 therein, preferably at a generally central location nearer to a center point of the rear wall than to any of the rear wall's perimeter edges from which the peripheral walls 536 of the case protrude forwardly from the rear wall to embrace around the perimeter of the smartphone/tablet. The socket 534 is of slightly greater than hemispherical size, such that the circular opening of the socket through which the ball tip 326 of the ball coupler 322" is inserted is normally of slightly lesser diameter than the ball tip 326, but the boundary edge around the socket opening is resiliently flexible so as to momentarily enlarge under forced pressure of the ball tip thereagainst to accommodate forced snap-fit insertion of the ball-tip, whereupon the socket opening will return to its normal size and thereby retain the ball-tip in snap-fit fashion.

When the ball coupler 32" and the socket 534 are mated in such snap-fit fashion, the case 530, and thus the smartphone/tablet contained therein, is attached to the movable support 524 of the holder 520 in an angle-adjustable manner tiltable about three orthogonal axes relative to the movable support so that the user can adjust a specific direction in which the smartphone/tablet faces away from the holder 520. Since the ball coupler 32" is adjustable in elevational location on said movable support by selective removal from, and relocation to, any of the mounting holes 528, the particular height at which the ball coupler 32" resides relative to the base is adjustable by two different mechanisms: elevational movement of the support 524, and adjustment of the elevational location of the ball coupler on the movable support 524. Such dual-mode adjustment provides more flexibility in accommodating different sizes of smartphone/tablet on the same holder versus use of displaced movement of the support as the sole source of elevational adjustment for the smartphone/tablet attachment point.

Similar multi-axis angularly adjustable support of the smartphone/tablet via a mated ball and socket joint may be accomplished through use of a socket-equipped smartphone/tablet accessory other than a protective case. For example, an alternative accessory would be a stick-on socket coupler having an adhesive or suction-cup base attachable to the backside of the smartphone/tablet, and carrying a socket-defining body thereon whose socket opening faces rearwardly away from the adhesive or suction-cup base. Also, while the illustrated embodiment uses a ball coupler on the holder 520 and a socket coupler integrated into the smartphone/tablet accessory 530, this configuration may be reversed, with a socket-coupler being elevationally adjustable on the movable support of the holder 520, and a ball-coupler being provided on the smartphone/tablet accessory 530.

The illustrated embodiment actually uses a dual-mode ball coupler 322" with a concavely and spherically contoured interior socket 326a that opens into the ball-tip 326 at the terminal end thereof furthest from the stem 324, whereby the dual-mode coupler 322" can serve as either the male ball of a first size of ball and socket joint, or the female socket of a smaller second size of ball and socket joint. Accordingly, compatibility both with socket-equipped smartphone/tablet accessories having a large socket for fitting externally over the ball tip 326 of the dual-mode coupler 322", and with ball-equipped smartphone/tablet accessories having a small ball tip capable of fitting into the smaller interior socket 326a of the dual-mode coupler 322".

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A convertible tripod apparatus comprising:
 a yoke comprising a set of three sockets distributed in circumferentially spaced fashion around a central axis of said yoke at a radially spaced distance outward therefrom, said sockets facing a common direction along said central axis; and
 a set of three legs each having a proximal ball-shaped end mated or matable with a respective one of the sockets of said yoke to form a ball and socket joint therewith about which the leg is movable into a variety of different angular orientations relative to a central axis, and a distal end residing oppositely of said proximal end on a linear reference axis of said leg;
 wherein each leg, between the proximal ball-shaped end and the distal end, is composed of angularly distinct segments of non-parallel relation to one another and to said reference axis, said angularly distinct sections including hand-grip segment and a joining segment, of which the hand-grip segment resides nearer to the distal end and the joining segment resides nearer to the ball-shaped proximal end to join the hand-grip segment thereto; and
 wherein the legs are movable between first positions in which the hand-grip segments thereof are mated together in parallel and adjacent relation to one another to collectively form a selfie-stick shaft by which the yoke can be manually carried, and second positions in which the hand-grip segments diverge outwardly away from one another and from said central axis in said common direction faced by said socket to form a tripod base atop which the yoke is supported.

2. The apparatus of claim 1 wherein the yoke and the legs are configured to place the formed selfie-stick in a predetermined orientation relative to the yoke when the hand grips are mated together in the first positions of the legs.

3. The apparatus of claim 2 wherein said predetermined orientation is parallel to the central axis of the yoke.

4. The apparatus of claim 2 wherein said predetermined orientation is incident with the central axis of the yoke.

5. The apparatus of claim 1 wherein the legs comprise mating pairs of detent features thereon that are positioned to align and engage upon movement of the legs into the first positions to prevent relative shifting therebetween.

6. The apparatus of claim 1 wherein the proximal ball-shaped end of each leg comprises a ball-shaped body comprising an outer surface occupying a spherical plane, and a plurality of pockets interrupting said outer surface at locations distributed over an area of said spherical plane, and being of recessed relation to said outer surface in an inwardly radial direction relative to said spherical plane.

7. The apparatus of claim 1 wherein said yoke further comprises a central bore passing therethrough on said central axis, and the selfie-stick shaft formed by the legs in the first positions thereof is dimensioned to enable insertion of said selfie-stick shaft through a matching second tripod yoke via the central bore thereof.

8. The apparatus of claim 7 wherein the legs are tapered at distal subsegments of the hand segment to impart a tapered outer diameter to the selfie-stick shaft at said distal subsegments of the legs.

9. The apparatus of claim 1 wherein the legs comprise arcuately contoured outer faces that each have an individual arcuate span of less than 360-degrees, but are adapted to collectively form a round 360-degree exterior of the selfie-stick shaft in the first positions of said legs.

10. The apparatus of claim 1 wherein the legs are tapered at distal subsegments of the hand segment to impart a tapered outer diameter to the selfie-stick shaft at said distal subsegments of the legs.

11. The apparatus of claim 1 wherein each leg comprises an alignment rib at the joining segment thereof and each socket comprises a respective slot in a wall of said socket for receiving said alignment rib when said legs are collapsed together into the first positions.

12. The apparatus of claim 11 wherein each slot is tapered toward the central axis of the yoke to guide the respective alignment rib into radial alignment with the central axis as the leg is folded inwardly there toward and into the first position.

13. The apparatus of claim 1 wherein each leg has a respective coupler mounted thereto adjacent the distal end thereof.

14. The apparatus of claim 13 wherein the respective coupler of each leg is pivotably mounted thereto.

15. The apparatus of claim 14 wherein said respective coupler of each leg is pivotable between a deployed position protruding beyond said distal end of the leg, and a stowed position of non-protruding relation from said distal end of the leg.

16. The apparatus of claim 15 wherein said respective coupler of each leg is stowed at an inner side of the leg in said stowed position, whereby the respective couplers of the legs reside internally of the selfie-stick shaft in the first positions of said legs.

17. The apparatus of claim 16 wherein the legs are tapered at distal subsegments of the hand segment to impart a tapered outer diameter to the selfie-stick shaft at said distal subsegments of the legs.

18. The apparatus of claim 13 wherein said respective coupler has a female opening therein at a coupling end thereof that is of opposing relation to a mounting end thereof that is mounted to the leg.

19. The apparatus of claim 18 wherein said female opening is a threaded bore for selective attachment of a separate threaded component to said coupler.

20. The apparatus of claim 19 wherein said separate threaded component is a ball coupler comprising a threaded stem matable with the threaded bore of the respective coupler, and a ball tip affixed to a distal end of said threaded stem.

* * * * *